United States Patent
Maes et al.

(10) Patent No.: US 6,964,023 B2
(45) Date of Patent: Nov. 8, 2005

(54) SYSTEM AND METHOD FOR MULTI-MODAL FOCUS DETECTION, REFERENTIAL AMBIGUITY RESOLUTION AND MOOD CLASSIFICATION USING MULTI-MODAL INPUT

(75) Inventors: Stephane Herman Maes, Danbury, CT (US); Chalapathy Venkata Neti, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 605 days.

(21) Appl. No.: 09/776,654

(22) Filed: Feb. 5, 2001

(65) Prior Publication Data

US 2002/0135618 A1 Sep. 26, 2002

(51) Int. Cl.[7] .................................................. G06F 3/00
(52) U.S. Cl. ........................ 715/811; 715/708; 715/966
(58) Field of Search ................................ 715/701, 702, 715/703, 704, 705–712, 863, 727–729, 811, 745, 789, 757; 710/65, 11, 14; 345/701, 702, 703, 705–712, 863, 714, 717, 718, 722, 737, 745, 746, 747, 811, 756, 755, 748, 773, 802–805; 704/8

(56) References Cited

U.S. PATENT DOCUMENTS

| | | | |
|---|---|---|---|
| 5,367,454 A | * 11/1994 | Kawamoto et al. ......... 715/706 |
| 5,517,021 A | 5/1996 | Kaufman et al. | |
| 5,600,765 A | 2/1997 | Ando et al. | |
| 5,771,042 A | 6/1998 | Santos-Gomez | |
| 5,877,763 A | * 3/1999 | Berry et al. ................ 345/746 |
| 5,895,447 A | 4/1999 | Ittycheriah et al. | |
| 5,912,721 A | 6/1999 | Yamaguchi et al. | |
| 5,937,383 A | 8/1999 | Ittycheriah et al. | |
| 6,018,341 A | * 1/2000 | Berry et al. ................ 345/746 |
| 6,073,101 A | 6/2000 | Maes | |
| 6,088,669 A | 7/2000 | Maes | |
| 6,144,391 A | 11/2000 | Hinson et al. | |
| 6,219,048 B1 | 4/2001 | Miller et al. | |
| 6,219,640 B1 | 4/2001 | Basu et al. | |
| 6,243,076 B1 | * 6/2001 | Hatfield ....................... 345/707 |
| 6,246,981 B1 | * 6/2001 | Papineni et al. ............ 704/235 |
| 6,269,336 B1 | 7/2001 | Ladd et al. | |
| 6,377,913 B1 | * 4/2002 | Coffman et al. ............... 704/8 |
| 6,385,583 B1 | 5/2002 | Ladd et al. | |
| 6,493,703 B1 | * 12/2002 | Knight et al. .................. 707/3 |
| 6,513,011 B1 | * 1/2003 | Uwakubo .................... 704/275 |
| 6,523,172 B1 | * 2/2003 | Martinez-Guerra et al. . 717/143 |
| 6,594,629 B1 | 7/2003 | Basu et al. | |
| 6,598,020 B1 | * 7/2003 | Kleindienst et al. ........ 704/270 |
| 6,600,502 B1 | * 7/2003 | Brewster, Jr. ............... 345/854 |
| 6,629,065 B1 | * 9/2003 | Gadh et al. .................... 703/1 |
| 6,658,388 B1 | * 12/2003 | Kleindienst et al. ........ 704/275 |
| 6,675,356 B1 | * 1/2004 | Adler et al. ................. 715/530 |
| 6,731,307 B1 | * 5/2004 | Strubbe et al. .............. 715/727 |
| 6,751,661 B1 | * 6/2004 | Geddes ........................ 709/223 |
| 6,754,643 B1 | * 6/2004 | Goldsmith .................... 706/14 |
| 6,779,060 B1 | * 8/2004 | Azvine et al. ................. 710/65 |
| 6,847,959 B1 | * 1/2005 | Arrouye et al. ................ 707/2 |

FOREIGN PATENT DOCUMENTS

| | | |
|---|---|---|
| WO | WO 00/21075 | 4/2000 |
| WO | WO 00/21232 | 4/2000 |

OTHER PUBLICATIONS

U.S. Appl. No. 09/015,150, filed Jan. 29, 1998, "Apparatus and Method for Generating Phonetic Transcriptions from Enrollment Utterances".

(Continued)

Primary Examiner—Steven Sax

(57) ABSTRACT

Systems and methods are provided for performing focus detection, referential ambiguity resolution and mood classification in accordance with multi-modal input data, in varying operating conditions, in order to provide an effective conversational computing environment for one or more users.

32 Claims, 14 Drawing Sheets

OTHER PUBLICATIONS

U.S. Appl. No. 09/507,526, filed Feb. 18, 2000, "Systems and Methods for Synchronizing Multi–Modal Interactions".

C.V. Neti et al., "Word–Based Confidence Measures as a Guide for Stack Search in Speech Recognition," ICASSP97, Munich, Germany, 4 pages, Apr. 1997.

N.R. Garner et al., "Robust Noise Detection for Speech Detection and Enhancement," Electronics Letters, vol. 33, No. 4, pp. 270–271, Feb. 1997.

B.S. Atal et al., "A Pattern Recognition Approach to Voiced–Unvoiced–Silence Classification with Applications to Speech Recognition," IEEE Transactions on Acoustics, Speech, and Signal Processing, vol. ASSP–24, No. 3, pp. 201–212, Jun. 1976.

H.S.M. Beigi et al., "IBM Model–Based and Frame–by–Frame Speaker–Recognition," Speaker Recognition and its Commercial and Forensic Applications, Avignon, France, 4 pages, 1998.

L. Wiscott et al., "Recognizing Faces by Dynamic Link Matching," Proceedings of the ICANN '97, Paris, pp. 1–6, 1995.

H. Ney, "On the Probabilistic Interpretation of Neural Network Classifiers and Discriminative Training Criteria," IEEE Transactions on Pattern Analysis and Machine Intelligence, vol. 17, No. 2, pp. 107–119, Feb. 1995.

M. Lincoln et al., "A Comparison of Two Unsupervised Approaches to Accent Identification," ICSLP '98, Sidney, 4 pages, 1998.

D. Matrouf et al., Language Identification Incorporating Lexical Information, ICSLP '98, 4 pages, 1998.

K.A. Papineni et al., "Free–Flow Dialog Management Using Forms," Proc. Eurospeech, Budapest, 4 pages, 1999.

K. Davies et al., "The IBM Conversational Telephony System for Financial Applications," Proc., Eurospeech, Budapest, 4 pages, 1999.

R. Brunelli, "Estimation of Pose and Illuminant Direction for Face Processing," Image and Vision Computing 15, pp. 1–10, 1997.

N. Kruger et al., "Determination of Face Position and Pose with a Learned Representation Based on Labelled Graphs," Image and Vision Computing 15, pp. 1–19, 1997.

P.N. Belhumeur et al., "Eigenfaces vs. Fisherfaces: Recognition Using Class Specific Linear Projection," IEEE Transactions on Pattern Analysis and Machine Intelligence, vol. 19, No. 7, pp. 711–720, Jul. 1997.

M. Turk et al., "Eigenfaces for Recognition," Journal of Cognitive Neuroscience, vol. 3, No. 1, pp. 71–86, 1991.

Andrew W. Senior, "Face and Feature Finding for a Face Recognition System," Proceedings of the Second International Conference on Audio– and Video–based Biometric Person Authentication, 6 pages, Mar. 1999.

D.K. Freeman et al., "The Voice Activity Detector for the Pan–European Digital Cellular Mobile Telephone Service," IEEE, CH2673–2, pp. 369–372, 1989.

S.P. Whiteside, "Simulated Emotions: An Acoustic Study of Voice and Perturbation Measures," ICSLP '98, 4 pages, 1998.

C. Pereira et al., "Some Acoustic Characteristics of Emotion," ICSLP '98, 3 pages, 1998.

N. Amir et al., "Towards an Automatic Classification of Emotions in Speech," ICSLP '98, 4 pages, 1998.

Iain Matthews, "Features for Audio–Visual Speech Recognition," Ph.D dissertation, School of Information Systems, University of East Anglia, pp. 1–207, Sep. 1998.

A.H. Gee et al., "Determining the Gaze of Faces in Images," University of Cambridge, CUED/F–INFENG/TR 174, pp. 1–20, Mar. 1994.

U.S. Appl. No. 09/544,823, filed Apr. 6, 2000, Maes et al. and entitled "Methods and Systems for Multi–Modal Browsing and Implementation of a Conversational Markup Language.".

U.S. Appl. No. 09/371,400, filed Aug. 10, 1999, D. Kanevsky et al. and entitled, "Conversational Data Mining.".

U.S. Appl. No. 09/369,707, filed Aug. 6, 1999, Basu et al. and entitled, "Methods and Apparatus for Audio–Visual Speech Detection and Recognition.".

U.S. Appl. No. 60/102,957, filed Oct. 2, 1998, D. Nahamoo et al. and entitled, "Conversational Browser and Conversational Systems.".

U.S. Appl. No. 99/22927, filed Oct. 2, 1998, D. Nahamoo et al. and entitled, "Conversational Computing Via Conversational Virtual Machine.".

A.J. Howell and Hilary Buxton, "Towards Visually Mediated Interaction Using Appearance–Based Models," CSRP 490, 13 pages, Jun. 1998.

* cited by examiner

FIG. 5A
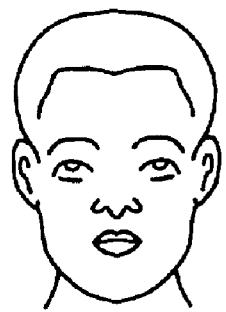
(I)
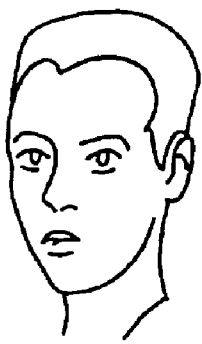
(II)
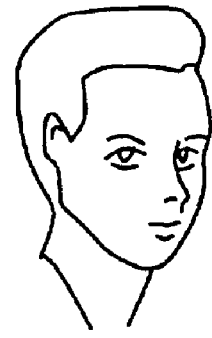
(III)
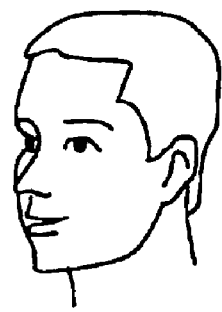
(IV)
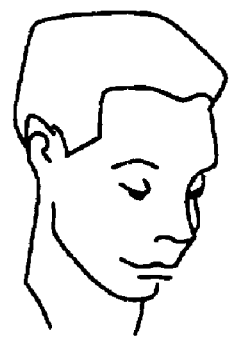
(V)

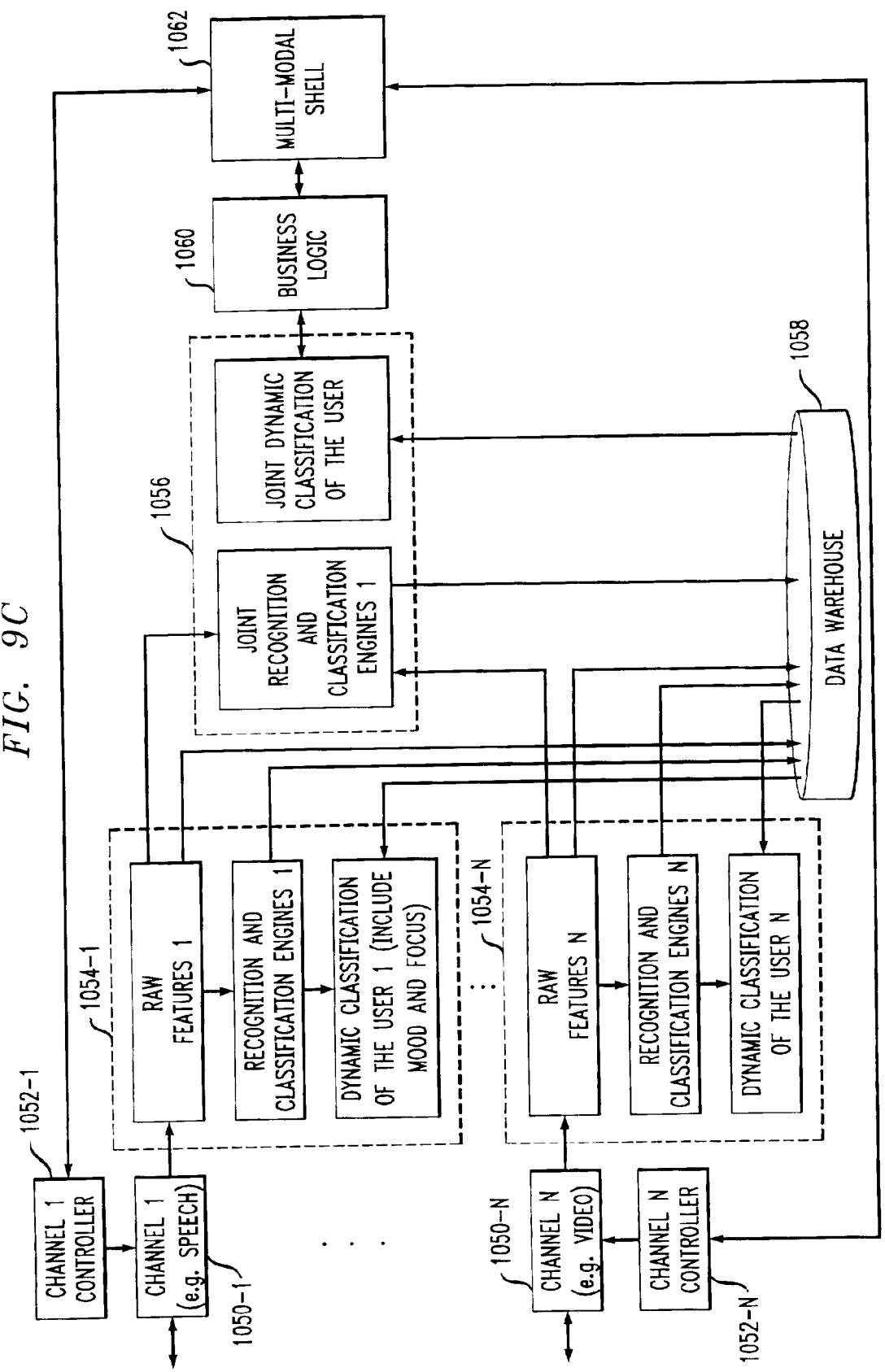

SYSTEM AND METHOD FOR MULTI-MODAL FOCUS DETECTION, REFERENTIAL AMBIGUITY RESOLUTION AND MOOD CLASSIFICATION USING MULTI-MODAL INPUT

FIELD OF THE INVENTION

The present invention relates to multi-modal data processing techniques and, more particularly, to systems and methods for performing focus detection, referential ambiguity resolution and mood classification in accordance with multi-modal input data.

BACKGROUND OF THE INVENTION

The use of more than one input mode to obtain data that may be used to perform various computing tasks is becoming increasingly more prevalent in today's computer-based processing systems. Systems that employ such "multi-modal" input techniques have inherent advantages over systems that use only one data input mode.

For example, there are systems that include a video input source and more traditional computer data input sources, such as the manual operation of a mouse device and/or keyboard in coordination with a multi-window graphical user interface (GUI). Examples of such systems are disclosed in U.S. Pat. No. 5,912,721 to Yamaguchi et al. issued on Jun. 15, 1999. In accordance with teachings in the Yamaguchi et al. system, apparatus may be provided for allowing a user to designate a position on the display screen by detecting the user's gaze point, which is designated by his line of sight with respect to the screen, without the user having to manually operate one of the conventional input devices.

Other systems that rely on eye tracking may include other input sources besides video to obtain data for subsequent processing. For example, U.S. Pat. No. 5,517,021 to Kaufman et al. issued May 14, 1996 discloses the use of an electro-oculographic (EOG) device to detect signals generated by eye movement and other eye gestures. Such EOG signals serve as input for use in controlling certain task-performing functions.

Still other multi-modal systems are capable of accepting user commands by use of voice and gesture inputs. U.S. Pat. No. 5,600,765 to Ando et al. issued Feb. 4, 1997 discloses such a system wherein, while pointing to either a display object or a display position on a display screen of a graphics display system through a pointing input device, a user commands the graphics display system to cause an event on a graphics display.

Another multi-modal computing concept employing voice and gesture input is known as "natural computing." In accordance with natural computing techniques, gestures are provided to the system directly as part of commands. Alternatively, a user may give spoken commands.

However, while such multi-modal systems would appear to have inherent advantages over systems that use only one data input mode, the existing multi-modal techniques fall significantly short of providing an effective conversational environment between the user and the computing system with which the user wishes to interact. That is, the conventional multi-modal systems fail to provide effective conversational computing environments. For instance, the use of user gestures or eye gaze in conventional systems, such as illustrated above, is merely a substitute for the use of a traditional GUI pointing device. In the case of natural computing techniques, the system independently recognizes voice-based commands and independently recognizes gesture-based commands. Thus, there is no attempt in the conventional systems to use one or more input modes to disambiguate or understand data input by one or more other input modes. Further, there is no attempt in the conventional systems to utilize multi-modal input to perform user mood or attention classification. Still further, in the conventional systems that utilize video as an data input modality, the video input mechanisms are confined to the visible wavelength spectrum. Thus, the usefulness of such systems is restricted to environments where light is abundantly available. Unfortunately, depending on the operating conditions, an abundance of light may not be possible or the level of light may be frequently changing (e.g., as in a moving car).

Accordingly, it would be highly advantageous to provide systems and methods for performing focus detection, referential ambiguity resolution and mood classification in accordance with multi-modal input data, in varying operating conditions, in order to provide an effective conversational computing environment for one or more users.

SUMMARY OF THE INVENTION

The present invention provides techniques for performing focus detection, referential ambiguity resolution and mood classification in accordance with multi-modal input data, in varying operating conditions, in order to provide an effective conversational computing environment for one or more users.

In one aspect of the invention, a multi-modal conversational computing system comprises a user interface subsystem configured to input multi-modal data from an environment in which the user interface subsystem is deployed. The multi-modal data includes at least audio-based data and image-based data. The environment includes one or more users and one or more devices which are controllable by the multi-modal system of the invention. The system also comprises at least one processor, operatively coupled to the user interface subsystem, and configured to receive at least a portion of the multi-modal input data from the user interface subsystem. The processor is further configured to then make a determination of at least one of an intent, a focus and a mood of at least one of the one or more users based on at least a portion of the received multi-modal input data. The processor is still further configured to then cause execution of one or more actions to occur in the environment based on at least one of the determined intent, the determined focus and the determined mood. The system further comprises a memory, operatively coupled to the at least one processor, which stores at least a portion of results associated with the intent, focus and mood determinations made by the processor for possible use in a subsequent determination or action.

Advantageously, such a multi-modal conversational computing system provides the capability to: (i) determine an object, application or appliance addressed by the user; (ii) determine the focus of the user and therefore determine if the user is actively focused on an appropriate application and, on that basis, to determine if an action should be taken; (iii) understand queries based on who said or did what, what was the focus of the user when he gave a multi-modal query/command and what is the history of these commands and focuses; and (iv) estimate the mood of the user and initiate and/or adapt some behavior/service/appliances accordingly. The computing system may also change the associated business logic of an application with which the user interacts.

It is to be understood that multi-modality, in accordance with the present invention, may comprise a combination of other modalities other than voice and video. For example, multi-modality may include keyboard/pointer/mouse (or telephone keypad) and other sensors, etc. Thus, a general principle of the present invention of the combination of modality through at least two different sensors (and actuators for outputs) to disambiguate the input, and guess the mood or focus, can be generalized to any such combination. Engines or classifiers for determining the mood or focus will then be specific to the sensors but the methodology of using them is the same as disclosed herein. This should be understood throughout the descriptions herein, even if illustrative embodiments focus on sensors that produce a stream of audio and video data.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 5A is diagram illustrating exemplary frontal face poses and non-frontal face poses for use according to an embodiment of the present invention;

FIGS. 9A through 9C are block diagrams illustrating respective mood classification systems for use according to an embodiment of the present invention.

DETAILED DESCRIPTION OF PREFERRED EMBODIMENTS

Figure 1:
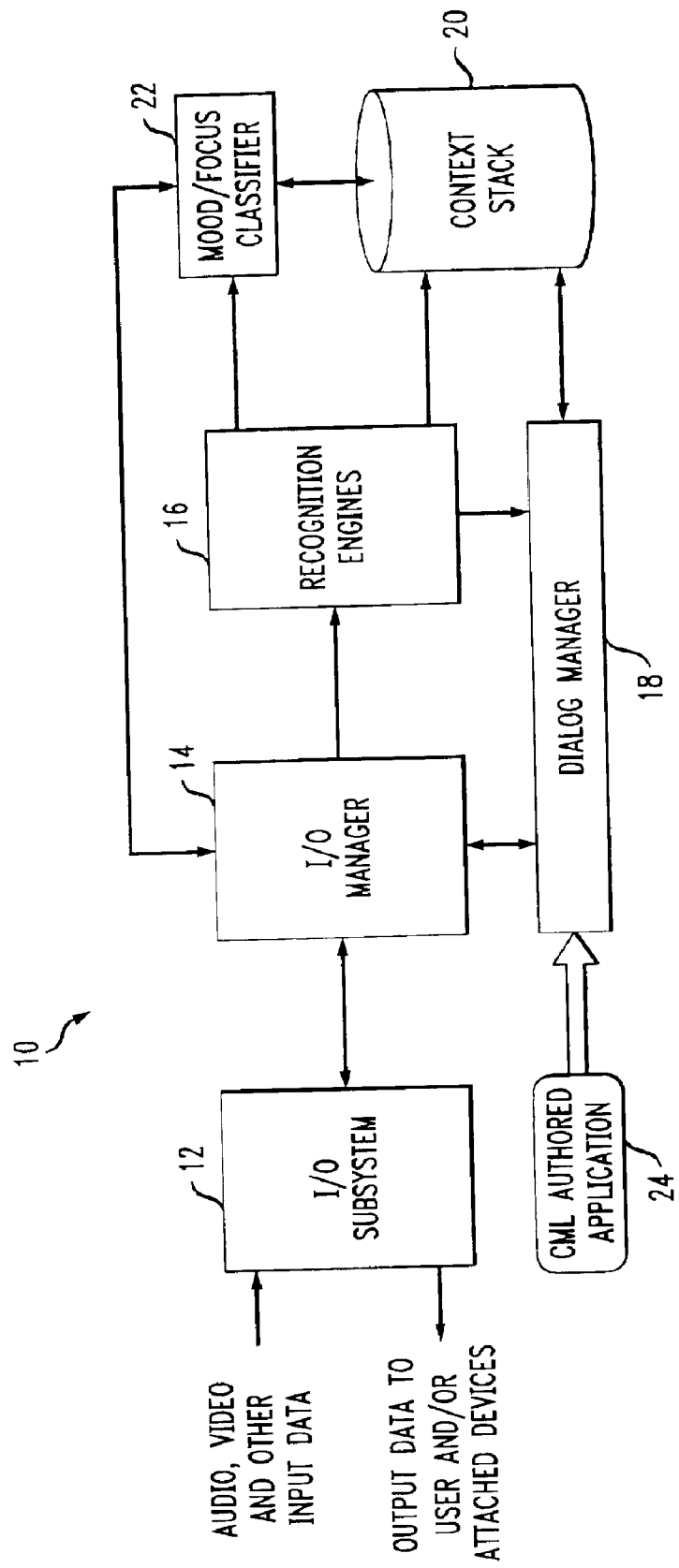
FIG. 1 is a block diagram illustrating a multi-modal conversational computing system according to an embodiment of the present invention.

Referring initially to FIG. 1, a block diagram illustrates a multi-modal conversational computing system according to an embodiment of the present invention. As shown, the multi-modal conversational computing system 10 comprises an input/output (I/O) subsystem 12, an I/O manager module 14, one or more recognition engines 16, a dialog manager module 18, a context stack 20 and a mood/focus classifier 22.

Generally, the multi-modal conversational computing system 10 of the present invention receives multi-modal input in the form of audio input data, video input data, as well as other types of input data (in accordance with the I/O subsystem 12), processes the multi-modal data (in accordance with the I/O manager 14), and performs various recognition tasks (e.g., speech recognition, speaker recognition, gesture recognition, lip reading, face recognition, etc., in accordance with the recognition engines 16), if necessary, using this processed data. The results of the recognition tasks and/or the processed data, itself, is then used to perform one or more conversational computing tasks, e.g., focus detection, referential ambiguity resolution, and mood classification (in accordance with the dialog manager 18, the context stack 20 and/or the classifier 22), as will be explained in detail below.

While the multi-modal conversational computing system of the present invention is not limited to a particular application, initially describing a few exemplary applications will assist in contextually understanding the various features that the system offers and functions that it is capable of performing.

Thus, by way of a first illustrative application, the multi-modal conversational computing system 10 may be employed within a vehicle. In such an example, the system may be used to detect a distracted or sleepy operator based on detection of abnormally long eye closure or gazing in another direction (by video input) and/or speech that indicates distraction or sleepiness (by audio input), and to then alert the operator of this potentially dangerous state. This is referred to as focus detection. By extracting and then tracking eye conditions (e.g., opened or closed) and/or face direction, the system can make a determination as to what the operator is focusing on. As will be seen, the system 10 may be configured to receive and process, not only visible image data, but also (or alternatively) non-visible image data such as infrared (IR) visual data. Also (or, again, alternatively), radio frequency (RF) data may be received and processed. So, in the case where the multi-modal conversational computing system is deployed in an operating environment where light is not abundant (i.e., poor lighting conditions), e.g., a vehicle driven at night, the system can still acquire multi-modal input, process data and then, if necessary, output an appropriate response. The system could also therefore operate in the absence of light.

The vehicle application lends itself also to an understanding of the concept of referential ambiguity resolution. Consider that there are multiple users in the vehicle and that the multi-modal conversational computing system 10 is coupled to several devices (e.g., telephone, radio, television, lights) which may be controlled by user input commands received and processed by the system. In such a situation, not only is there multi-modal input, but there may be multi-modal input from multiple occupants of the vehicle.

Thus, the system 10 must be able to perform user reference resolution, e.g., the system may receive the spoken utterance, "call my office," but unless the system can resolve which occupant made this statement, it will not know which office phone number to direct an associated cellular telephone to call. The system 10 therefore performs referential ambiguity resolution with respect to multiple users by taking both audio input data and image data input and processing it to make a user resolution determination. This may include detecting speech activity and/or the identity of the user based on both audio and image cues. Techniques for accomplishing this will be explained below.

Similarly, a user may say to the system, "turn that off," but without device reference resolution, the system would not know which associated device to direct to be turned off. The system 10 therefore performs referential ambiguity resolution with respect to multiple devices by taking both audio input data and image data input and processing it to make a device resolution determination. This may include detecting the speaker's head pose using gross spatial resolution of the direction being addressed, or body pose (e.g., pointing). This may also include disambiguating an I/O (input/output) event generated previously and stored in a context manager/history stack (e.g., if a beeper rang and the user asked "turn it off," the term "it" can be disambiguated). Techniques for accomplishing this will be explained below.

In addition, the system 10 may make a determination of a vehicle occupant's mood or emotional state in order to effect control of other associated devices that may then effect that state. For instance, if the system detects that the user is warm or cold, the system may cause the temperature to be adjusted for each passenger. If the passenger is tired, the system may cause the adjustment of the seat, increase the music volume, etc. Also, as another example (not necessarily an in-vehicle system), an application interface responsiveness may be tuned to the mood of the user. For instance, if the user seems confused, help may be provided by the system. Further, if the user seems upset, faster executions are attempted. Still further, if the user is uncertain, the system may ask for confirmation or offer to guide the user.

While the above example illustrates an application where the multi-modal conversational computing system 10 is deployed in a vehicle, in another illustrative arrangement, the system can be deployed in a larger area, e.g., a room with multiple video input and speech input devices, as well as multiple associated devices controlled by the system 10. Given the inventive teachings herein, one of ordinary skill in the art will realize other applications in which the multi-modal conversational computing system may be employed.

Given the functional components of the multi-modal conversational computing system 10 of FIG. 1, as well as keeping in mind the exemplary applications described above, the following description of FIGS. 2 and 3 provide a general explanation of the interaction of the functional components of the system 10 during the course of the execution of one or more such applications.

Figure 2:
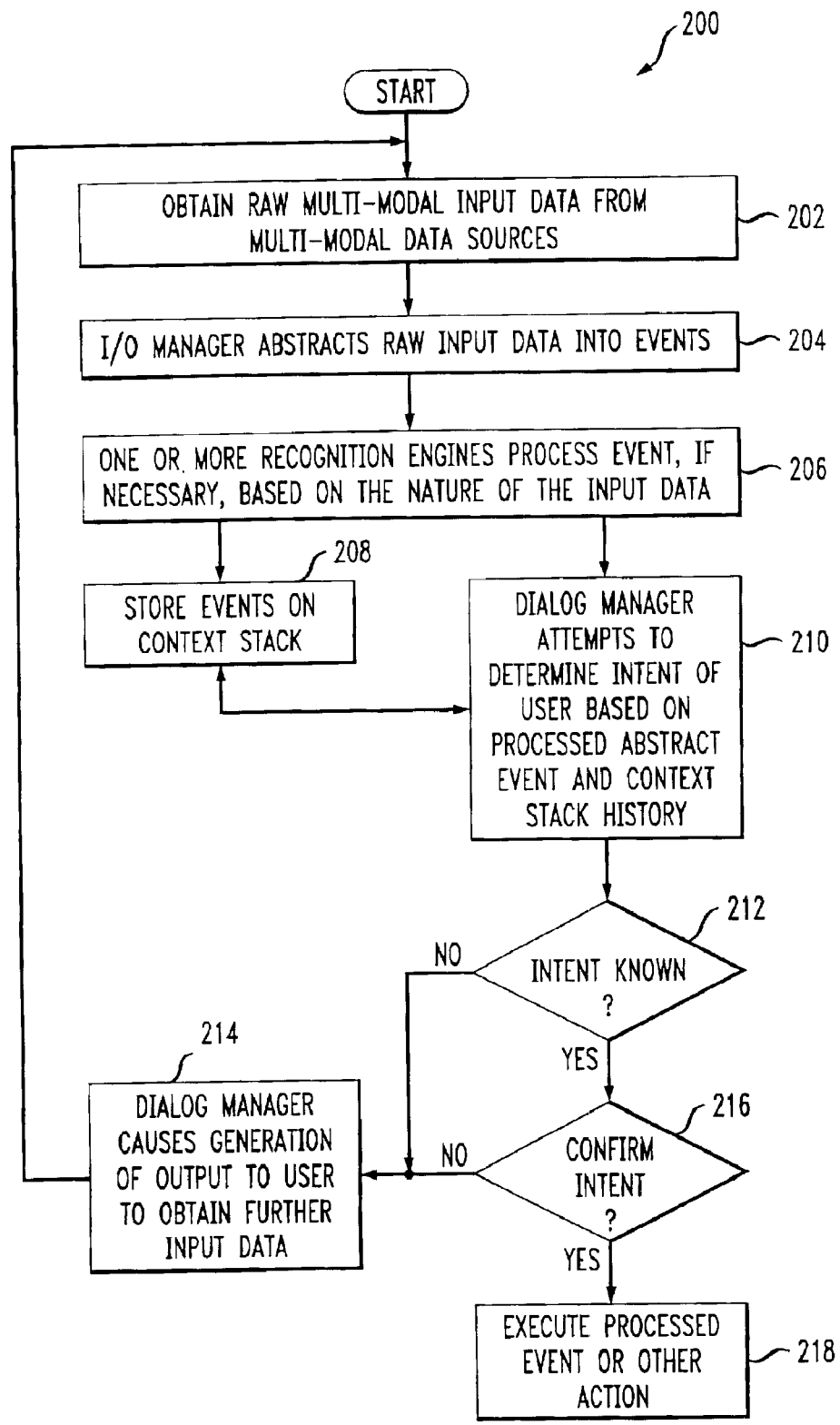
FIG. 2 is a flow diagram illustrating a referential ambiguity resolution methodology performed by a multi-modal conversational computing system according to an embodiment of the present invention.

Referring now to FIG. 2, a flow diagram illustrates a methodology 200 performed by a multi-modal conversational computing system by which referential ambiguity resolution (e.g., user and/or device disambiguation) is accomplished.

First, in step 202, raw multi-modal input data is obtained from multi-modal data sources associated with the system. In terms of the computing system 10 in FIG. 1, such sources are represented by I/O subsystem 12. As mentioned above, the data input portion of the subsystem may comprise one or more cameras or sensors for capturing video input data representing the environment in which the system (or, at least, the I/O subsystem) is deployed. The cameras/sensors may be capable of capturing not only visible image data (images in the visible electromagnetic spectrum), but also IR (near, mid and/or far field IR video) and/or RF image data.

Of course, in systems with more than one camera, different mixes of cameras/sensors may be employed, e.g., system having one or more video cameras, one or more IR sensors and/or one or more RF sensors.

In addition to the one or more cameras, the I/O subsystem 12 may comprise one or more microphones for capturing audio input data from the environment in which the system is deployed. Further, the I/O subsystem may also include an analog-to-digital converter which converts the electrical signal generated by a microphone into a digital signal representative of speech uttered or other sounds that are captured. Further, the subsystem may sample the speech signal and partition the signal into overlapping frames so that each frame is discretely processed by the remainder of the system.

Thus, referring to the vehicle example above, it is to be understood that the cameras and microphones may be strategically placed throughout the vehicle in order to attempt to fully capture all visual activity and audio activity that may be necessary for the system to make ambiguity resolution determinations.

Still further, the I/O subsystem 12 may also comprise other typical input devices for obtaining user input, e.g., GUI-based devices such as a keyboard, a mouse, etc., and/or other devices such as a stylus and digitizer pad for capturing electronic handwriting, etc. It is to be understood that one of ordinary skill in the art will realize other user interfaces and devices that may be included for capturing user activity.

Next, in step 204, the raw multi-modal input data is abstracted into one or more events. In terms of the computing system 10 in FIG. 1, the data abstraction is performed by the I/O manager 14. The I/O manager receives the raw multi-modal data and abstracts the data into a form that represents one or more events, e.g., a spoken utterance, a visual gesture, etc. As is known, a data abstraction operation may involve generalizing details associated with all or portions of the input data so as to yield a more generalized representation of the data for use in further operations.

In step 206, the abstracted data or event is then sent by the I/O manager 14 to one or more recognition engines 16 in order to have the event recognized, if necessary. That is, depending on the nature of the event, one or more recognition engines may be used to recognize the event. For example, if the event is some form of spoken utterance wherein the microphone picks up the audible portion of the utterance and a camera picks up the visual portion (e.g., lip movement) of the utterance, the event may be sent to an audio-visual speech recognition engine to have the utterance recognized using both the audio input and the video input associated with the speech. Alternatively, or in addition, the event may be sent to an audio-visual speaker recognition engine to have the speaker of the utterance identified, verified and/or authenticated. Also, both speech recognition and speaker recognition can be combined on the same utterance.

If the event is some form of user gesture picked up by a camera, the event may be sent to a gesture recognition engine for recognition. Again, depending on the types of user interfaces provided by the system, the event may comprise handwritten input provided by the user such that one of the recognition engines may be a handwriting recognition engine. In the case of more typical GUI-based input (e.g., keyboard, mouse, etc.), the data may not necessarily need to be recognized since the data is already identifiable without recognition operations.

An audio-visual speech recognition module that may be employed as one of the recognition engines 16 is disclosed in U.S. patent application identified as Ser. No. 09/369,707, filed on Aug. 6, 1999 and entitled "Methods and Apparatus for Audio-visual Speech Detection and Recognition," the disclosure of which is incorporated by reference herein. A description of such an audio-visual speech recognition system will be provided below. An audio-visual speaker recognition module that may be employed as one of the recognition engines 16 is disclosed in U.S. patent application identified as Ser. No. 09/369,706, filed on Aug. 6, 1999 and entitled "Methods And Apparatus for Audio-Visual Speaker Recognition and Utterance Verification," the disclosure of which is incorporated by reference herein. A description of such an audio-visual speaker recognition system will be provided below. It is to be appreciated that gesture recognition (e.g., body, arms and/or hand movement, etc., that a user employs to passively or actively give instruction to the system) and focus recognition (e.g., direction of face and eyes of a user) may be performed using the recognition modules described in the above-referenced patent applications. With regard to focus detection, however, the classifier 22 is preferably used to determine the focus of the user and, in addition, the user's mood.

It is to be appreciated that two, more or even all of the input modes described herein may be synchronized via the techniques disclosed in U.S. patent application identified as Ser. No. 09/507,526 filed on Feb. 18, 2000 and entitled "Systems and Method for Synchronizing Multi-modal Interactions," which claims priority to U.S. provisional patent application identified as U.S. Ser. No. 60/128,081 filed on Apr. 7, 1999 and U.S. provisional patent application identified by Ser. No. 60/158,777 filed on Oct. 12, 1999, the disclosures of which are incorporated by reference herein.

In step 208, the recognized events, as well as the events that do not need to be recognized, are stored in a storage unit referred to as the context stack 20. The context stack is used to create a history of interaction between the user and the system so as to assist the dialog manager 18 in making referential ambiguity resolution determinations when determining the user's intent.

Next, in step 210, the system 10 attempts to determine the user intent based on the current event and the historical interaction information stored in the context stack and then determine and execute one or more application programs that effectuate the user's intention and/or react to the user activity. The application depends on the environment that the system is deployed in. The application may be written in any computer programming language but preferably it is written in a Conversational Markup Language (CML) as disclosed in U.S. patent application identified as Ser. No. 09/544,823 filed Apr. 6, 2000 and entitled "Methods and Systems for Multi-modal Browsing and Implementation of a Conversational Markup Language;" U.S. patent application identified as Ser. No. 60/102,957 filed on Oct. 2, 1998 and entitled "Conversational Browser and Conversational Systems" to which priority is claimed by PCT patent application identified as PCT/US99/23008 filed on Oct. 1, 1999; as well as the above-referenced U.S. patent application identified as Ser. No. 09/507,526, the disclosures of which are incorporated by reference herein.

Thus, the dialog manager must first determine the user's intent based on the current event and, if available, the historical information (e.g., past events) stored in the context stack. For instance, returning to the vehicle example, the user may say "turn it on," while pointing at the vehicle radio. The dialog manager would therefore receive the results of the recognized events associated with the spoken utterance "turn it on" and the gesture of pointing to the radio. Based on these events, the dialog manager does a search of the existing applications, transactions or "dialogs," or portions thereof, with which such an utterance and gesture could be associated. Accordingly, as shown in FIG. 1, the dialog manager 18 determines the appropriate CML-authored application 24. The application may be stored on the system 10 or accessed (e.g., downloaded) from some remote location. If the dialog manager determines with some predetermined degree of confidence that the application it selects is the one which will effectuate the users desire, the dialog manager executes the next step of the multi-modal dialog (e.g., prompt or display for missing, ambiguous or confusing information, asks for confirmation or launches the execution of an action associated to a fully understood multi-modal request from the user) of that application based on the multi-modal input. That is, the dialog manager selects the appropriate device (e.g., radio) activation routine and instructs the I/O manager to output a command to activate the radio. The predetermined degree of confidence may be that at least two input parameters or variables of the application are satisfied or provided by the received events. Of course, depending on the application, other levels of confidence and algorithms may be established as, for example, described in K. A. Papineni, S. Roukos, R. T. Ward, "Free-flow dialog management using forms," Proc. Eurospeech, Budapest, 1999; and K. Davies et al., "The IBM conversational telephony system for financial applications," Proc. Eurospeech, Budapest, 1999, the disclosures of which are incorporated by reference herein.

Consider the case where the user first says "turn it on," and then a few seconds later points to the radio. The dialog manager would first try to determine user intent based solely on the "turn it on" command. However, since there are likely other devices in the vehicle that could be turned on, the system would likely not be able to determine with a sufficient degree of confidence what the user was referring to. However, this recognized spoken utterance event is stored on the context stack. Then, when the recognized gesture event (e.g., pointing to the radio) is received, the dialog manager takes this event and the previous spoken utterance event stored on the context stack and makes a determination that the user intended to have the radio turned on.

Consider the case where the user says "turn it on," but makes no gesture and provides no other utterance. In this case, assume that the dialog manager does not have enough input to determine the user intent (step 212 in FIG. 2) and thus implement the command. The dialog manager, in step 214, then causes the generation of an output to the user requesting further input data so that the user's intent can be disambiguated. This may be accomplished by the dialog manager instructing the I/O manager to have the I/O subsystem output a request for clarification. In one embodiment, the I/O subsystem 12 may comprise a text-to-speech (TTS) engine and one or more output speakers. The dialog manager then generates a predetermined question such as "what device do you want to have turned on?" which the TTS engine converts to a synthesized utterance that is audibly output by the speaker to the user. The user, hearing the query, could then point to the radio or say "the radio" thereby providing the dialog manager with the additional input data to disambiguate his request. That is, with reference to FIG. 2, the system 10 obtains the raw input data, again in step 202, and the process 200 iterates based on the new data. Such iteration can continue as long as necessary for the dialog manager to determine the user's intent.

The dialog manager 18 may also seek confirmation in step 216 from the user in the same manner as the request for more information (step 214) before executing the processed event, dispatching a task and/or executing some other action in step 218 (e.g., causing the radio to be turned on). For example, the system may output "do you want the radio turned on?" To which the user may respond "yes." The system then causes the radio to be turned on. Further, the dialog manager 18 may store information it generates and/or obtains during the processing of a current event on the context stack 20 for use in making resolution or other determinations at some later time.

Of course, it is to be understood that the above example is a simple example of device ambiguity resolution. As mentioned, the system 10 can also make user ambiguity resolution determinations, e.g., in a multiple user environment, someone says "dial my office." Given the explanation above, one of ordinary skill will appreciate how the system 10 could handle such a command in order to decide who among the multiple users made the request and then effectuate the order.

Also, the output to the user to request further input may be made in any other number of ways and with any amount of interaction turns between the user and feedback from the system to the user. For example, the I/O subsystem 12 may include a GUI-based display whereby the request is made by the system in the form of a text message displayed on the screen of the display. One of ordinary skill in the art will appreciate many other output mechanisms for implementing the teachings herein.

It is to be appreciated the conversational virtual machine disclosed in PCT patent application identified as PCT/US99/22927 filed on Oct. 1, 1999 and entitled "Conversational Computing Via Conversational Virtual Machine," the disclosure of which is incorporated by reference herein, may be employed to provide a framework for the I/O manager, recognition engines, dialog manager and context stack of the invention. A description of such a conversational virtual machine will be provided below.

Also, while focus or attention detection is preferably performed in accordance with the focus/mood classifier 22, as will be explained below, it is to be appreciated that such operation can also be performed by the dialog manager 18, as explained above.

Figure 3:
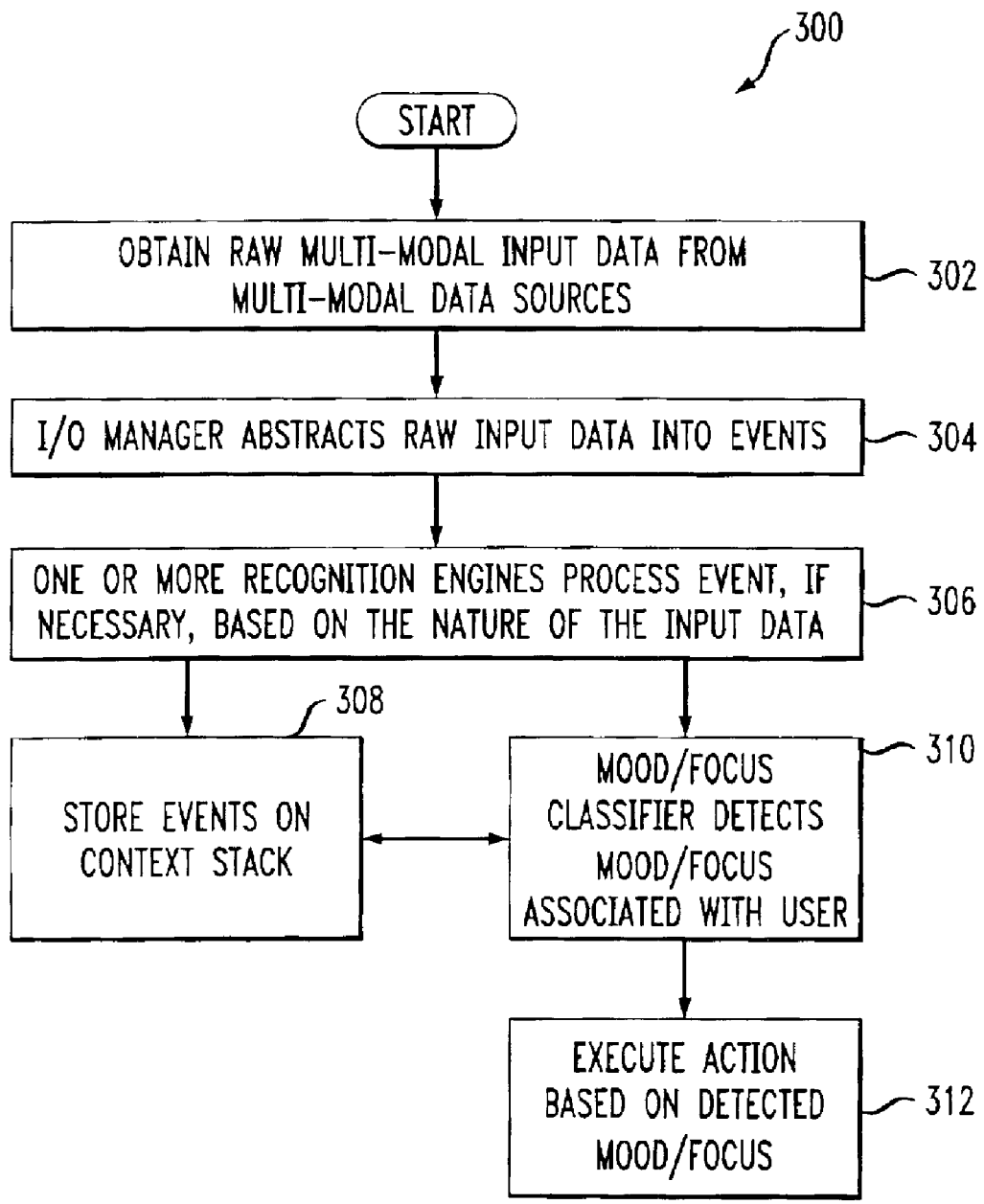
FIG. 3 is a flow diagram illustrating a mood/focus classification methodology performed by a multi-modal conversational computing system according to an embodiment of the present invention.

Referring now to FIG. 3, a flow diagram illustrates a methodology 300 performed by a multi-modal conversational computing system by which mood classification and/or focus detection is accomplished. It is to be appreciated that the system 10 may perform the methodology of FIG. 3 in parallel with the methodology of FIG. 2 or at separate times. And because of this, the events that are stored by one process in the context stack can be used by the other.

It is to be appreciated that steps 302 through 308 are similar to steps 202 through 208 in FIG. 2. That is, the I/O subsystem 12 obtains raw multi-modal input data from the various multi-modal sources (step 302); the I/O manager 14 abstracts the multi-modal input data into one or more events (step 304); the one or more recognition engines 16 recognize the event, if necessary, based on the nature of the one or more events (step 306); and the events are stored on the context stack (step 308).

As described in the above vehicle example, in the case of focus detection, the system 10 may determine the focus (and focus history) of the user in order to determine whether he is paying sufficient attention to the task of driving (assuming he is the driver). Such determination may be made by noting abnormally long eye closure or gazing in another direction and/or speech that indicates distraction or sleepiness. The system may then alert the operator of this potentially dangerous state. In addition, with respect to mood classification, the system may make a determination of a vehicle occupant's mood or emotional state in order to effect control of other associated devices that may then effect that state. Such focus and mood determinations are made in step 310 by the focus/mood classifier 22.

The focus/mood classifier 22 receives either the events directly from the I/O manager 14 or, if necessary depending on the nature of the event, the classifier receives the recognized events from the one or more recognition engines 16. For instance, in the vehicle example, the focus/mood classifier may receive visual events indicating the position of the user's eyes and/or head as well as audio events indicating sounds the user may be making (e.g., snoring). Using these events, as well as past information stored on the context stack, the classifier makes the focus detection and/or mood classification determination. Results of such determinations may also be stored on the context stack.

Then, in step 312, the classifier may cause the execution of some action depending on the resultant determination. For example, if the driver's attention is determined to be distracted, the I/O manager may be instructed by the classifier to output a warning message to the driver via the TTS system and the one or more output speakers. If the driver is determined to be tired due, for example, to his monitored body posture, the I/O manager may be instructed by the classifier to provide a warning message, adjust the temperature or radio volume in the vehicle, etc.

It is to be appreciated the conversational data mining system disclosed in U.S. patent application identified as Ser. No. 09/371,400 filed on Aug. 10, 1999 and entitled "Conversational Data Mining," the disclosure of which is incorporated by reference herein, may be employed to provide a framework for the mood/focus classifier of the invention. A description of such a conversational data mining system will be provided below.

For ease of reference, the remainder of the detailed description will be divided into the following sections: (A) Audio-visual speech recognition; (B) Audio-visual speaker recognition; (C) Conversational Virtual Machine; and (D) Conversational Data Mining. These sections describe detailed preferred embodiments of certain components of the multi-modal conversational computing system 10 shown in FIG. 1, as will be explained in each section.

A. Audio-visual Speech Recognition

Figure 4:
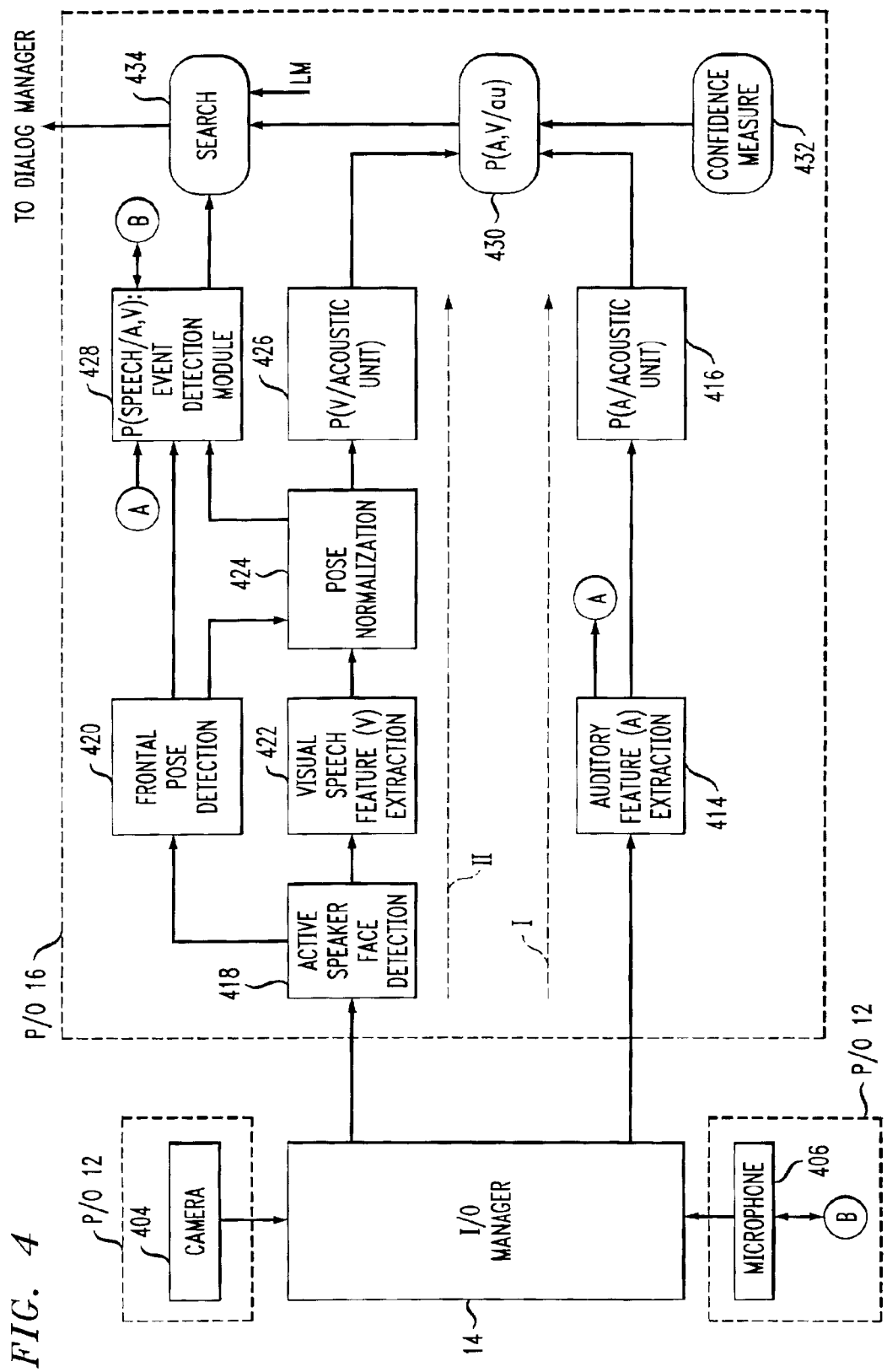
FIG. 4 is a block diagram illustrating an audio-visual speech recognition module for use according to an embodiment of the present invention.

Referring now to FIG. 4, a block diagram illustrates a preferred embodiment of an audio-visual speech recognition module that may be employed as one of the recognition modules of FIG. 1 to perform speech recognition using multi-modal input data received in accordance with the invention. It is to be appreciated that such an audio-visual speech recognition module is disclosed in the above-referenced U.S. patent application identified as Ser. No. 09/369,707, filed on Aug. 6, 1999 and entitled "Methods and Apparatus for Audio-visual Speech Detection and Recognition." A description of one of the embodiments of such an audio-visual speech recognition module for use in a preferred embodiment of the multi-modal conversational computing system of the invention is provided below in this section. However, it is to be appreciated that other mechanisms for performing speech recognition may be employed.

This particular illustrative embodiment, as will be explained, depicts audio-visual recognition using a decision fusion approach. It is to be appreciated that one of the advantages that the audio-visual speech recognition module described herein provides is the ability to process arbitrary content video. That is, previous systems that have attempted to utilize visual cues from a video source in the context of speech recognition have utilized video with controlled conditions, i.e., non-arbitrary content video. That is, the video content included only faces from which the visual cues were taken in order to try to recognize short commands or single words in a predominantly noiseless environment. However, as will be explained in detail below, the module described herein is preferably able to process arbitrary content video which may not only contain faces but may also contain arbitrary background objects in a noisy environment. One example of arbitrary content video is in the context of broadcast news. Such video can possibly contain a newsperson speaking at a location where there is arbitrary activity and noise in the background. In such a case, as will be explained, the module is able to locate and track a face and, more particularly, a mouth, to determine what is relevant visual information to be used in more accurately recognizing the accompanying speech provided by the speaker. The module is also able to continue to recognize when the speaker's face is not visible (audio only) or when the speech in inaudible (lip reading only).

Thus, the module is capable of receiving real-time arbitrary content from a video camera 404 and microphone 406 via the I/O manager 14. It is to be understood that the camera and microphone are part of the I/O subsystem 12. While the video signals received from the camera 404 and the audio signals received from the microphone 406 are shown in FIG. 4 as not being compressed, they may be compressed and therefore need to be decompressed in accordance with the applied compression scheme.

It is to be understood that the video signal captured by the camera 404 can be of any particular type. As mentioned, the face and pose detection techniques may process images of any wavelength such as, e.g., visible and/or non-visible electromagnetic spectrum images. By way of example only, this may include infrared (IR) images (e.g., near, mid and far field IR video) and radio frequency (RF) images. Accordingly, the module may perform audio-visual speech detection and recognition techniques in poor lighting conditions, changing lighting conditions, or in environments without light. For example, the system may be installed in an automobile or some other form of vehicle and capable of capturing IR images so that improved speech recognition may be performed. Because video information (i.e., including visible and/or non-visible electromagnetic spectrum images) is used in the speech recognition process, the system is less susceptible to recognition errors due to noisy conditions, which significantly hamper conventional recognition systems that use only audio information. In addition, due to the methodologies for processing the visual information described herein, the module provides the capability to perform accurate LVCSR (large vocabulary continuous speech recognition).

A phantom line denoted by Roman numeral I represents the processing path the audio information signal takes within the module, while a phantom line denoted by Roman numeral II represents the processing path the video information signal takes within the module. First, the audio signal path I will be discussed, then the video signal path II, followed by an explanation of how the two types of information are combined to provide improved recognition accuracy.

The module includes an auditory feature extractor 414. The feature extractor 414 receives an audio or speech signal and, as is known in the art, extracts spectral features from the signal at regular intervals. The spectral features are in the form of acoustic feature vectors (signals) which are then passed on to a probability module 416. Before acoustic vectors are extracted, the speech signal may be sampled at a rate of 16 kilohertz (kHz). A frame may consist of a segment of speech having a 25 millisecond (msec) duration. In such an arrangement, the extraction process preferably produces 24 dimensional acoustic cepstral vectors via the process described below. Frames are advanced every 10 msec to obtain succeeding acoustic vectors. Note that other acoustic front-ends with other frame sizes and sampling rates/signal bandwidths can also be employed.

First, in accordance with a preferred acoustic feature extraction process, magnitudes of discrete Fourier transforms of samples of speech data in a frame are considered in a logarithmically warped frequency scale. Next, these amplitude values themselves are transformed to a logarithmic scale. The latter two steps are motivated by a logarithmic sensitivity of human hearing to frequency and amplitude. Subsequently, a rotation in the form of discrete cosine transform is applied. One way to capture the dynamics is to use the delta (first-difference) and the delta-delta (second-order differences) information. An alternative way to capture dynamic information is to append a set of (e.g., four) preceding and succeeding vectors to the vector under consideration and then project the vector to a lower dimensional space, which is chosen to have the most discrimination. The latter procedure is known as Linear Discriminant Analysis (LDA) and is well known in the art.

After the acoustic feature vectors, denoted in FIG. 4. by the letter A, are extracted, the probability module labels the extracted vectors with one or more previously stored phonemes which, as is known in the art, are sub-phonetic or acoustic units of speech. The module may also work with lefemes, which are portions of phones in a given context. Each phoneme associated with one or more feature vectors has a probability associated therewith indicating the likelihood that it was that particular acoustic unit that was spoken. Thus, the probability module yields likelihood scores for each considered phoneme in the form of the probability that, given a particular phoneme or acoustic unit (au), the acoustic unit represents the uttered speech characterized by one or more acoustic feature vectors A or, in other words, P(A|acoustic unit). It is to be appreciated that the processing performed in blocks 414 and 416 may be accomplished via any conventional acoustic information recognition system capable of extracting and labeling acoustic feature vectors, e.g., Lawrence Rabiner, Biing-Hwang Juang, "Fundamentals of Speech Recognition," Prentice Hall, 1993.

Referring now to the video signal path II of FIG. 4, the methodologies of processing visual information will now be explained. The audio-visual speech recognition module (denoted in FIG. 4 as part of block 16 from FIG. 1) includes an active speaker face detection module 418. The active speaker face detection module 418 receives video input camera 404. It is to be appreciated that speaker face detection can also be performed directly in the compressed data domain and/or from audio and video information rather than just from video information. In any case, module 418 generally locates and tracks the speaker's face and facial features within the arbitrary video background. This will be explained in detail below.

The recognition module also preferably includes a frontal pose detection module 420. It is to be understood that the detection module 420 serves to determine whether a speaker in a video frame is in a frontal pose. This serves the function of reliably determining when someone is likely to be uttering or is likely to start uttering speech that is meant to be processed by the module, e.g., recognized by the module. This is the case at least when the speaker's face is visible from one of the cameras. When it is not, conventional speech recognition with, for example, silence detection, speech activity detection and/or noise compensation can be used. Thus, background noise is not recognized as though it were speech, and the starts of utterances are not mistakenly discarded. It is to be appreciated that not all speech acts performed within the hearing of the module are intended for the system. The user may not be speaking to the system, but to another person present or on the telephone. Accordingly, the module implements a detection module such that the modality of vision is used in connection with the modality of speech to determine when to perform certain functions in auditory and visual speech recognition.

One way to determine when a user is speaking to the system is to detect when he is facing the camera and when his mouth indicates a speech or verbal activity. This copies human behavior well. That is, when someone is looking at you and moves his lips, this indicates, in general, that he is speaking to you.

In accordance with the face detection module 418 and frontal pose detection module 420, we detect the "frontalness" of a face pose in the video image being considered. We call a face pose "frontal" when a user is considered to be: (i) more or less looking at the camera; or (ii) looking directly at the camera (also referred to as "strictly frontal"). Thus, in a preferred embodiment, we determine "frontalness" by determining that a face is absolutely not frontal (also referred to as "non-frontal"). A non-frontal face pose is when the orientation of the head is far enough from the strictly frontal orientation that the gaze can not be interpreted as directed to the camera nor interpreted as more or less directed at the camera. Examples of what are considered frontal face poses and non-frontal face poses in a preferred embodiment are shown in FIG. 5A. Poses I, II and III illustrate face poses where the user's face is considered frontal, and poses IX and V illustrate face poses where the user's face is considered non-frontal.

Figure 5B:
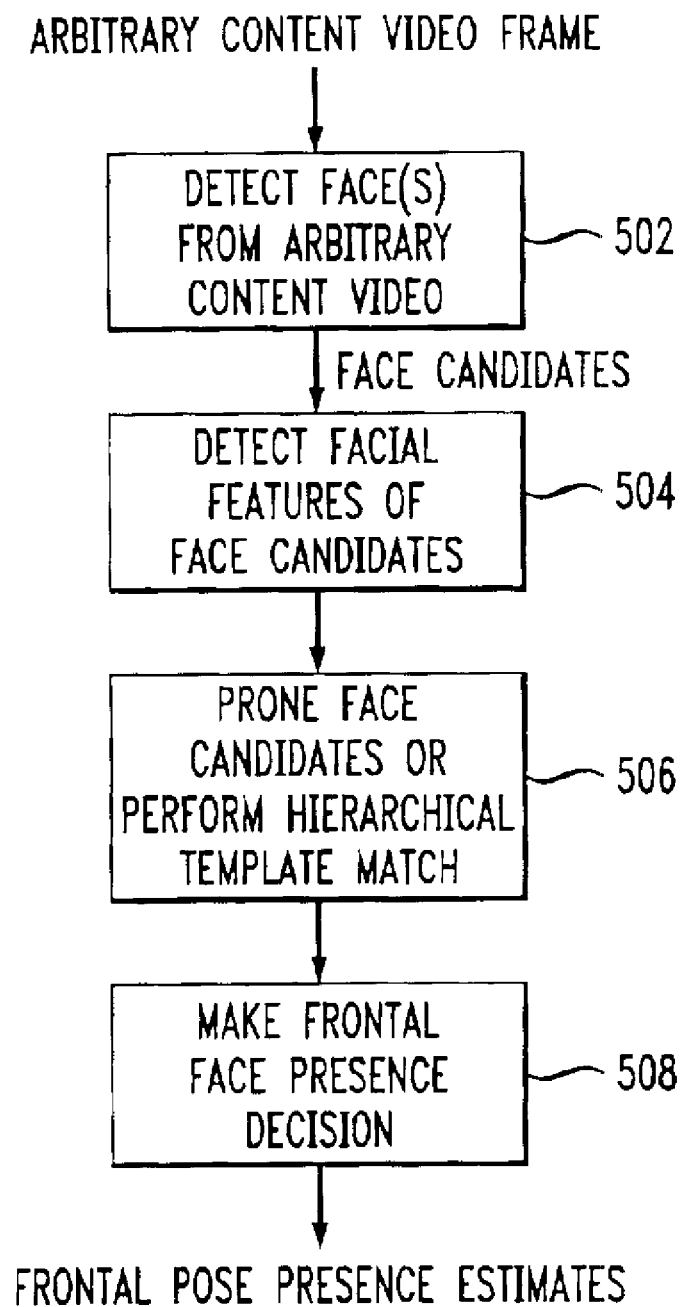
FIG. 5B is a flow diagram of a face/feature and frontal pose detection methodology for use according to an embodiment of the present invention.

Referring to FIG. 5B, a flow diagram of an illustrative method of performing face detection and frontal pose detection is shown. The first step (step 502) is to detect face candidates in an arbitrary content video frame received from the camera 404. Next, in step 504, we detect facial features on each candidate such as, for example, nose, eyes, mouth, ears, etc. Thus, we have all the information necessary to prune the face candidates according to their frontalness, in step 506. That is, we remove candidates that do not have sufficient frontal characteristics, e.g., a number of well detected facial features and distances between these features. An alternate process in step 506 to the pruning method involves a hierarchical template matching technique, also explained in detail below. In step 508, if at least one face candidate exists after the pruning mechanism, it is determined that a frontal face is in the video frame being considered.

There are several ways to solve the general problem of pose detection. First, a geometric method suggests to simply consider variations of distances between some features in a two dimensional representation of a face (i.e., a camera image), according to the pose. For instance, on a picture of a slightly turned face, the distance between the right eye and the nose should be different from the distance between the left eye and the nose, and this difference should increase as the face turns. We can also try to estimate the facial orientation from inherent properties of a face. In the article by A. Gee and R. Cipolla, "Estimating Gaze from a Single View of a Face," Tech. Rep. CUED/F-INFENG/TR174, March 1994, it is suggested that the facial normal is estimated by considering mostly pose invariant distance ratios within a face.

Another way is to use filters and other simple transformations on the original image or the face region. In the article by R. Brunelli, "Estimation of pose and illuminant direction for face processing," Image and Vision Computing 15, pp. 741–748, 1997, for instance, after a preprocessing stage that tends to reduce sensitivity to illumination, the two eyes are projected on the horizontal axis and the amount of asymmetry yields an estimation of the rotation of the face.

In methods referred to as training methods, one tries to "recognize" the face pose by modeling several possible poses of the face. One possibility is the use of Neural Networks like Radial Basic Function (RBF) networks as described in the article by A. J. Howell and Hilary Buxton, "Towards Visually Mediated Interaction Using Appearance-Based Models," CSRP 490, June 1998. The RBF networks are trained to classify images in terms of pose classes from low resolution pictures of faces.

Another approach is to use three dimensional template matching. In the article by N. Kruger, M. Potzch, and C. von der Malsburg, "Determination of face position and pose with a learned representation based on labeled graphs," Image and Vision Computing 15, pp. 665–673, 1997, it is suggested to use a three dimensional elastic graph matching to represent a face. Each node is associated with a set of Gabor jets and the similarity between the candidate graph and the templates for different poses can be optimized by deforming the graph.

Of course, these different ways can be combined to yield better results. Almost all of these methods assume that a face has been previously located on a picture, and often assume that some features in the face like the eyes, the nose and so on, have been detected. Moreover some techniques, especially the geometric ones, rely very much on the accuracy of this feature position detection.

But face and feature finding on a picture is a problem that also has many different solutions. In a preferred embodiment, we consider it as a two-class detection problem which is less complex than the general pose detection problem that aims to determine face pose very precisely. By two-class detection, as opposed to multi-class detection, we mean that a binary decision is made between two options, e.g., presence of a face or absence of a face, frontal face or non-frontal face, etc. While one or more of the techniques described above may be employed, the techniques we implement in a preferred embodiment are described below.

In such a preferred embodiment, the main technique employed by the active speaker face detection module 418 and the frontal pose detection module 420 to do face and feature detection is based on Fisher Linear Discriminant (FLD) analysis. A goal of FLD analysis is to get maximum discrimination between classes and reduce the dimensionality of the feature space. For face detection, we consider two classes: (i) the In-Class, which comprises faces, and; (ii) the Out-Class, composed of non-faces. The criterion of FLD analysis is then to find the vector of the feature space $\vec{W}$ that maximizes the following ratio:

$$J(\vec{w}) = \frac{\vec{w}^t S_B \vec{w}}{\vec{w}^t S_W \vec{w}} \quad (1)$$

where $S_B$ is the between-class scatter matrix and $S_W$ the within-class scatter matrix.

Having found the right $\vec{w}$ (which is referred to as the FLD), we then project each feature vector $\vec{x}$ on it by computing $\vec{w}^T\vec{x}$ and compare the result to a threshold in order to decide whether $\vec{x}$ belongs to the In-Class or to the Out-Class. It should be noted that we may use Principal Component Analysis (PCA), as is known, to reduce dimensionality of the feature space prior to finding the vector of the feature space $\vec{w}$ that maximizes the ratio in equation (1), e.g., see P. N. Belhumeur, J. P. Hespanha, and D. J. Kriegman, "Eigenfaces vs. Fisherfaces: Recognition Using Class Specific Linear Projection," IEEE Transactions on Pattern Analysis and Machine Intelligence, vol. 19, no. 7, Jul. 1997.

Face detection (step 502 of FIG. 5B) involves first locating a face in the first frame of a video sequence and the location is tracked across frames in the video clip. Face detection is preferably performed in the following manner. For locating a face, an image pyramid over permissible scales is generated and, for every location in the pyramid, we score the surrounding area as a face location. After a skin-tone segmentation process that aims to locate image regions in the pyramid where colors could indicate the presence of a face, the image is sub-sampled and regions are compared to a previously stored diverse training set of face templates using FLD analysis. This yields a score that is combined with a Distance From Face Space (DFFS) measure to give a face likelihood score. As is known, DFFS considers the distribution of the image energy over the eigenvectors of the covariance matrix. The higher the total score, the higher the chance that the considered region is a face. Thus, the locations scoring highly on all criteria are determined to be faces. For each high scoring face location, we consider small translations, scale and rotation changes that occur from one frame to the next and re-score the face region under each of these changes to optimize the estimates of these parameters (i.e., FLD and DFFS). DFFS is also described in the article by M. Turk and A. Pentland, "Eigenfaces for Recognition," Journal of Cognitive Neuro Science, vol. 3, no. 1, pp. 71–86, 1991. A computer vision-based face identification method for face and feature finding which may be employed in accordance with the invention is described in Andrew Senior, "Face and feature finding for face recognition system," $2^{nd}$ Int. Conf. On Audio-Video based Biometric Person Authentication, Washington D.C., March 1999.

A similar method is applied, combined with statistical considerations of position, to detect the features within a face (step 504 of FIG. 5B). Notice that this face and feature detection technique is designed to detect strictly frontal faces only, and the templates are intended only to distinguish strictly frontal faces from non-faces: more general frontal faces are not considered at all.

Of course, this method requires the creation of face and feature templates. These are generated from a database of frontal face images. The training face or feature vectors are added to the In-class and some Out-class vectors are generated randomly from the background in our training images.

In a score thresholding technique, the total score may be compared to a threshold to decide whether or not a face candidate or a feature candidate is a true face or feature. This score, being based on FLD analysis, has interesting properties for the practical pose detection problem. Indeed, for a given user, the score varies as the user is turning his head, e.g., the score being higher when the face is more frontal.

Then, having already a method to detect strictly frontal faces and features in it, we adapt it as closely as possible for our two-class detection problem. In a preferred embodiment, the module provides two alternate ways to adapt (step 506 of FIG. 5B) the detection method: (i) a pruning mechanism and; (ii) a hierarchical template matching technique.

Pruning Mechanism

Here, we reuse templates already computed for face detection. Our face and feature detection technique only needs strictly frontal faces training data and thus we do not require a broader database. The method involves combining face and feature detection to prune non-frontal faces. We first detect faces in the frame according to the algorithm we have discussed above, but intentionally with a low score threshold. This low threshold allows us to detect faces that are far from being strictly frontal, so that we do not miss any more or less frontal faces. Of course, this yields the detection of some profile faces and even non-faces. Then, in each candidate, we estimate the location of the face features (eyes, nose, lips, etc.).

The false candidates are pruned from the candidates according to the following independent computations:

(i) The sum of all the facial feature scores: this is the score given by our combination of FLD and DFFS. The sum is to be compared to a threshold to decide if the candidate should be discarded.

(ii) The number of main features that are well recognized: we discard candidates with a low score for the eyes, the nose and the mouth. Indeed, these are the most characteristic and visible features of a human face and they differ a lot between frontal and non-frontal faces.

(iii) The ratio of the distance between each eye and the center of the nose.

(iv) The ratio of the distance between each eye and the side of the face region (each face is delimited by a square for template matching, see, e.g., A. Senior reference cited above. Particularly, the ratio is the distance of the outer extremity of the left eye from the medial axis over the distance of the outer extremity of the right eye from the medial axis. The ratio depends on the perspective angle of the viewer and can therefore be used as a criterion.

These ratios, for two-dimensional projection reasons, will differ from unity, the more the face is non-frontal. So, we compute these ratios for each face candidate and compare them to unity to decide if the candidate has to be discarded or not.

Then, if one or more face candidates remain in the candidates stack, we will consider that a frontal face has been detected in the considered frame.

Finally, for practical reasons, we preferably use a burst mechanism to smooth results. Here, we use the particularity of our interactive system: since we consider a user who is (or is not) in front of the camera, we can take its behavior in time into account. As the video camera is expected to take pictures from the user at a high rate (typically 30 frames per second), we can use the results of the former frames to predict the results in the current one, considering that humans move slowly compared to the frame rate.

So, if a frontal face has been detected in the current frame, we may consider that it will remain frontal in the next x frames (x depends on the frame rate). Of course, this will add some false positive detections when the face actually becomes non-frontal from frontal as the user turns his head or leaves, but we can accept some more false positive detections if we get lower false negative detections. Indeed, false negative detections are worse for our human-computer interaction system than false positive ones: it is very important to not miss a single word of the user speech, even if the computer sometimes listens too much.

This pruning method has many advantages. For example, it does not require the computation of a specific database: we can reuse the one computed to do face detection. Also, compared to simple thresholding, it discards some high score non-faces, because it relies on some face-specific considerations such as face features and face geometry.

Hierarchical Template Matching

Another solution to solve our detection problem is to modify the template matching technique. Indeed, our FLD computation technique does not consider "non-frontal" faces at all: In-class comprises only "strictly frontal" faces and Out-class only non-faces. So, in accordance with this alternate embodiment, we may use other forms of templates such as:

(i) A face template where the In-Class includes frontal faces as well as non-frontal faces, unlike the previous technique, and where the Out-Class includes comprises non-frontal faces.

(ii) A pose template where the In-Class includes strictly frontal faces and the Out-Class includes non-frontal faces.

The use of these two templates allows us to do a hierarchical template matching. First, we do template matching with the face template in order to compute a real face-likelihood score. This one will indicate (after the comparison with a threshold) if we have a face (frontal or non-frontal) or a non-face. Then, if a face has been actually detected by this matching, we can perform the second template matching with the pose template that, this time, will yield a frontalness-likelihood score. This final pose score has better variations from non-frontal to frontal faces than the previous face score.

Thus, the hierarchical template method makes it easier to find a less user independent threshold so that we could solve our problem by simple face finding score thresholding. One advantage of the hierarchical template matching method is that the pose score (i.e., the score given by the pose template matching) is very low for non-faces (i.e., for non-faces that could have been wrongly detected as faces by the face template matching), which helps to discard non-faces.

Given the results of either the pruning method or the hierarchical template matching method, one or more frontal pose presence estimates are output by the module 420 (FIG. 4). These estimates (which may include the FLD and DFFS parameters computed in accordance with modules 418 and 420) represent whether or not a face having a frontal pose is detected in the video frame under consideration. These estimates are used by an event detection module 428, along with the audio feature vectors A extracted in module 414 and visual speech feature vectors V extracted in a visual speech feature extractor module 422, explained below.

Returning now to FIG. 4, the visual speech feature extractor 422 extracts visual speech feature vectors (e.g., mouth or lip-related parameters), denoted in FIG. 4 as the letter V, from the face detected in the video frame by the active speaker face detector 418.

Examples of visual speech features that may be extracted are grey scale parameters of the mouth region; geometric/model based parameters such as area, height, width of mouth region; lip contours arrived at by curve fitting, spline parameters of inner/outer contour; and motion parameters obtained by three dimensional tracking. Still another feature set that may be extracted via module 422 takes into account the above factors. Such technique is known as Active Shape modeling and is described in Iain Matthews, "Features for audio visual speech recognition," Ph.D dissertation, School of Information Systems, University of East Anglia, January 1998.

Thus, while the visual speech feature extractor 422 may implement one or more known visual feature extraction techniques, in one embodiment, the extractor extracts grey scale parameters associated with the mouth region of the image. Given the location of the lip corners, after normalization of scale and rotation, a rectangular region containing the lip region at the center of the rectangle is extracted from the original decompressed video frame. Principal Component Analysis (PCA), as is known, may be used to extract a vector of smaller dimension from this vector of grey-scale values.

Another method of extracting visual feature vectors that may be implemented in module 422 may include extracting geometric features. This entails extracting the phonetic/visemic information from the geometry of the lip contour and its time dynamics. Typical parameters may be the mouth corners, the height or the area of opening, the curvature of inner as well as the outer lips. Positions of articulators, e.g., teeth and tongue, may also be feature parameters, to the extent that they are discernible by the camera.

The method of extraction of these parameters from grey scale values may involve minimization of a function (e.g., a cost function) that describes the mismatch between the lip contour associated with parameter values and the grey scale image. Color information may be utilized as well in extracting these parameters.

From the captured (or demultiplexed and decompressed) video stream one performs a boundary detection, the ultimate result of which is a parameterized contour, e.g., circles, parabolas, ellipses or, more generally, spline contours, each of which can be described by a finite set of parameters.

Still other features that can be extracted include two or three dimensional wire-frame model-based techniques of the type used in the computer graphics for the purposes of animation. A wire-frame may consist of a large number of triangular patches. These patches together give a structural representation of the mouth/lip/jaw region, each of which contain useful features in speech-reading. These parameters could also be used in combination with grey scale values of the image to benefit from the relative advantages of both schemes.

The extracted visual speech feature vectors are then normalized in block 424 with respect to the frontal pose estimates generated by the detection module 420. The normalized visual speech feature vectors are then provided to a probability module 426. Similar to the probability module 416 in the audio information path which labels the acoustic feature vectors with one or more phonemes, the probability module 426 labels the extracted visual speech vectors with one or more previously stored phonemes. Again, each phoneme associated with one or more visual speech feature vectors has a probability associated therewith indicating the likelihood that it was that particular acoustic unit that was spoken in the video segment being considered. Thus, the probability module yields likelihood scores for each considered phoneme in the form of the probability that, given a particular phoneme or acoustic unit (au), the acoustic unit represents the uttered speech characterized by one or more visual speech feature vectors V or, in other words, P(V|acoustic unit). Alternatively, the visual speech feature vectors may be labeled with visemes which, as previously mentioned, are visual phonemes or canonical mouth shapes that accompany speech utterances.

Next, the probabilities generated by modules 416 and 426 are jointly used by A, V probability module 430. In module 430, the respective probabilities from modules 416 and 426 are combined based on a confidence measure 432. Confidence estimation refers to a likelihood or other confidence measure being determined with regard to the recognized input. Recently, efforts have been initiated to develop appropriate confidence measures for recognized speech. In LVCSR Hub5 Workshop, Apr. 29–May 1, 1996, MITAGS, MD, organized by NIST and DARPA, different approaches are proposed to attach to each word a confidence level. A first method uses decision trees trained on word-dependent features (amount of training utterances, minimum and average triphone occurrences, occurrence in language model training, number of phonemes/lefemes, duration, acoustic score (fast match and detailed match), speech or non-speech), sentence-dependent features (signal-to-noise ratio, estimates of speaking rates: number of words or of lefemes or of vowels per second, sentence likelihood provided by the language model, trigram occurrence in the language model), word in a context features (trigram occurrence in language model) as well as speaker profile features (accent, dialect, gender, age, speaking rate, identity, audio quality, SNR, etc . . . ). A probability of error is computed on the training data for each of the leaves of the tree. Algorithms to build such trees are disclosed, for example, in Breiman et al., "Classification and regression trees," Chapman & Hall, 1993. At recognition, all or some of these features are measured during recognition and for each word the decision tree is walked to a leave which provides a confidence level. In C. Neti, S. Roukos and E. Eide "Word based confidence measures as a guide for stack search in speech recognition," ICASSP97, Munich, Germany, April, 1997, is described a method relying entirely on scores returned by IBM stack decoder (using log-likelihood—actually the average incremental log-likelihood, detailed match, fast match). In the LVCSR proceeding, another method to estimate the confidence level is done using predictors via linear regression. The predictor used are: the word duration, the language model score, the average acoustic score (best score) per frame and the fraction of the N-Best list with the same word as top choice.

The present embodiment preferably offers a combination of these two approaches (confidence level measured via decision trees and via linear predictors) to systematically extract the confidence level in any translation process, not limited to speech recognition. Another method to detect incorrectly recognized words is disclosed in U.S. Pat. No. 5,937,383 entitled "Apparatus and Methods for Speech Recognition Including Individual or Speaker Class Dependent Decoding History Caches for Fast Word Acceptance or Rejection," the disclosure of which is incorporated herein by reference.

Thus, based on the confidence measure, the probability module 430 decides which probability, i.e., the probability from the visual information path or the probability from the audio information path, to rely on more. This determination may be represented in the following manner:

$$w_1 v_P + w_2 a_P. \qquad (2)$$

It is to be understood that $v_P$ represents a probability associated with the visual information, $a_P$ represents a probability associated with the corresponding audio information, and $w_1$ and $w_2$ represent respective weights. Thus, based on the confidence measure 432, the module 430 assigns appropriate weights to the probabilities. For instance, if the surrounding environmental noise level is particularly high, i.e., resulting in a lower acoustic confidence measure, there is more of a chance that the probabilities generated by the acoustic decoding path contain errors. Thus, the module 430 assigns a lower weight for $w_2$ than for $w_1$ placing more reliance on the decoded information from the visual path. However, if the noise level is low and thus the acoustic confidence measure is relatively higher, the module may set $w_2$ higher than $w_1$. Alternatively, a visual confidence measure may be used. It is to be appreciated that the first joint use of the visual information and audio information in module 430 is referred to as decision or score fusion. An alternative embodiment implements feature fusion as described in the above-referenced U.S. patent application identified as Ser. No. 09/369,707.

Then, a search is performed in search module 434 with language models (LM) based on the weighted probabilities received from module 430. That is, the acoustic units identified as having the highest probabilities of representing what was uttered in the arbitrary content video are put together to form words. The words are output by the search engine 434 as the decoded system output. A conventional search engine may be employed. This output is provided to the dialog manager 18 of FIG. 1 for use in disambiguating the user's intent, as described above.

In a preferred embodiment, the audio-visual speech recognition module of FIG. 4 also includes an event detection module 428. As previously mentioned, one problem of conventional speech recognition systems is there inability to discriminate between extraneous audible activity, e.g., background noise or background speech not intended to be decoded, and speech that is indeed intended to be decoded. This causes such problems as misfiring of the system and "junk" recognition. According to various embodiments, the module may use information from the video path only, information from the audio path only, or information from both paths simultaneously to decide whether or not to decode information. This is accomplished via the event detection module 428. It is to be understood that "event detection" refers to the determination of whether or not an actual speech event that is intended to be decoded is occurring or is going to occur. Based on the output of the event detection module, microphone 406 or the search engine 434 may be enabled/disabled. Note that if no face is detected, then the audio can be processed to make decisions.

Figure 5C:
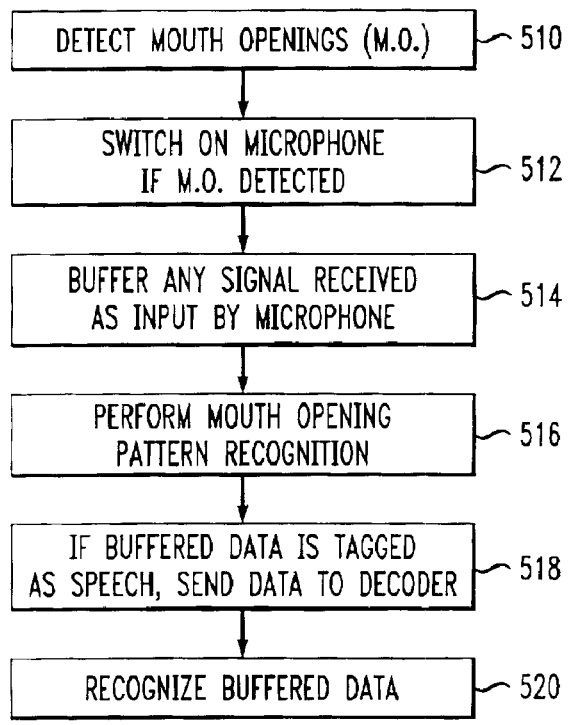
FIG. 5C is a flow diagram of an event detection methodology for use according to an embodiment of the present invention.

Referring now to FIG. 5C, an illustrative event detection method using information from the video path only to make the detection decision is shown. To make this determination, the event detection module 428 receives input from the frontal pose detector 420, the visual feature extractor 424 (via the pose normalization block 426), and the audio feature extractor 414.

First, in step 510, any mouth openings on a face identified as "frontal" are detected. This detection is based on the tracking of the facial features associated with a detected frontal face, as described in detail above with respect to modules 418 and 420. If a mouth opening or some mouth motion is detected, microphone 406 is turned on, in step 512. Once the microphone is turned on, any signal received therefrom is stored in a buffer (step 514). Then, mouth opening pattern recognition (e.g., periodicity) is performed on the mouth movements associated with the buffered signal to determine if what was buffered was in fact speech (step 516). This is determined by comparing the visual speech feature vectors to pre-stored visual speech patterns consistent with speech. If the buffered data is tagged as speech, in step 518, the buffered data is sent on through the acoustic path so that the buffered data may be recognized, in step 520, so as to yield a decoded output. The process is repeated for each subsequent portion of buffered data until no more mouth openings are detected. In such case, the microphone is then turned off. It is to be understood that FIG. 5C depicts one example of how visual information (e.g., mouth openings) is used to decide whether or not to decode an input audio signal. The event detection module may alternatively control the search module 434, e.g., turning it on or off, in response to whether or not a speech event is detected. Thus, the event detection module is generally a module that decides whether an input signal captured by the microphone is speech given audio and corresponding video information or, P(Speech|A, V).

It is also to be appreciated that the event detection methodology may be performed using the audio path information only. In such case, the event detection module 428 may perform one or more speech-only based detection methods such as, for example: signal energy level detection (e.g., is audio signal above a given level); signal zero crossing detection (e.g., are there high enough zero crossings); voice activity detection (non-stationarity of the spectrum) as described in, e.g., N. R. Garner et al., "Robust noise detection for speech recognition and enhancement," Electronics letters, February 1997, vol. 33, no. 4, pp. 270–271; D. K. Freeman et al., "The voice activity detector of the pan-European digital mobile telephone service, IEEE 1989, CH2673-2; N. R. Garner, "Speech detection in adverse mobile telephony acoustic environments," to appear in Speech Communications; B. S Atal et al., "A pattern recognition approach to voiced-unvoiced-silence classification with applications to speech recognition, IEEE Trans. Acoustic, Speech and Signal Processing, vol. ASSP-24 n3, 1976. See also, L. R. Rabiner, "Digital processing of speech signals," Prentice-hall, 1978.

Figure 5D:
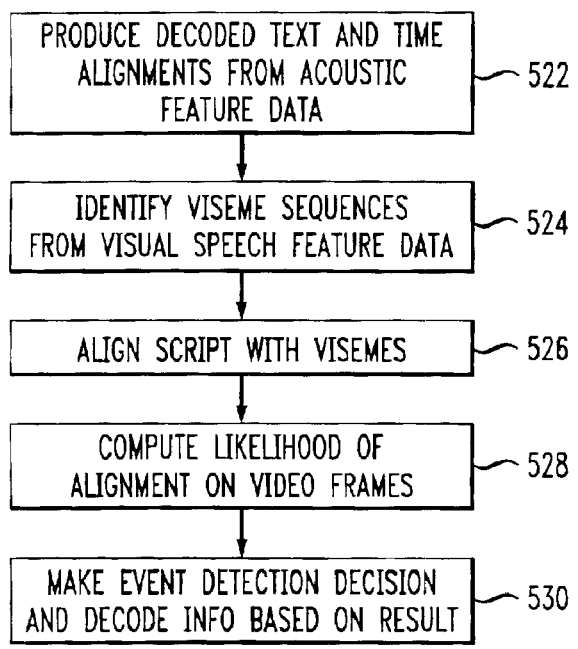
FIG. 5D is a flow diagram of an event detection methodology employing utterance verification for use according to an embodiment of the present invention.

Referring now to FIG. 5D, an illustrative event detection method simultaneously using both information from the video path and the audio path to make the detection decision is shown. The flow diagram illustrates unsupervised utterance verification methodology as is also described in the U.S. patent application identified as U.S. Ser. No. 09/369,706, filed Aug. 6, 1999 and entitled: "Methods And Apparatus for Audio-Visual Speaker Recognition and Utterance Verification," the disclosure of which is incorporated by reference herein. In the unsupervised mode, utterance verification is performed when the text (script) is not known and available to the system.

Thus, in step 522, the uttered speech to be verified may be decoded by classical speech recognition techniques so that a decoded script and associated time alignments are available. This is accomplished using the feature data from the acoustic feature extractor 414. Contemporaneously, in step 524, the visual speech feature vectors from the visual feature extractor 422 are used to produce a visual phonemes (visemes) sequence.

Next, in step 526, the script is aligned with the visemes. A rapid (or other) alignment may be performed in a conventional manner in order to attempt to synchronize the two information streams. For example, in one embodiment, rapid alignment as disclosed in the U.S. patent application identified as Ser. No. 09/015,150 and entitled "Apparatus and Method for Generating Phonetic Transcription from Enrollment Utterances," the disclosure of which is incorporated by reference herein, may be employed. Then, in step 528, a likelihood on the alignment is computed to determine how well the script aligns to the visual data. The results of the likelihood are then used, in step 530, to decide whether an actual speech event occurred or is occurring and whether the information in the paths needs to be recognized.

The audio-visual speech recognition module of FIG. 4 may apply one of, a combination of two of, or all three of, the approaches described above in the event detection module 428 to perform event detection. Video information only based detection is useful so that the module can do the detection when the background noise is too high for a speech only decision. The audio only approach is useful when speech occurs without a visible face present. The combined approach offered by unsupervised utterance verification improves the decision process when a face is detectable with the right pose to improve the acoustic decision.

Besides minimizing or eliminating recognition engine misfiring and/or "junk" recognition, the event detection methodology provides better modeling of background noise, that is, when no speech is detected, silence is detected. Also, for embedded applications, such event detection provides additional advantages. For example, the CPU associated with an embedded device can focus on other tasks instead of having to run in a speech detection mode. Also, a battery power savings is realized since speech recognition engine and associated components may be powered off when no speech is present. Other general applications of this speech detection methodology include: (i) use with visible electromagnetic spectrum image or non-visible electromagnetic spectrum image (e.g., far IR) camera in vehicle-based speech detection or noisy environment; (ii) speaker detection in an audience to focus local or array microphones; (iii) speaker recognition (as in the above-referenced U.S. patent application Ser. No. 09/369,706 and tagging in broadcast news or TeleVideo conferencing. One of ordinary skill in the art will contemplate other applications given the inventive teachings described herein.

It is to be appreciated that the audio-visual speech recognition module of FIG. 4 may employ the alternative embodiments of audio-visual speech detection and recognition described in the above-referenced U.S. patent application identified as Ser. No. 09/369,707. For instance, whereas the embodiment of FIG. 4 illustrates a decision or score fusion approach, the module may employ a feature fusion approach and/or a serial rescoring approach, as described in the above-referenced U.S. patent application identified as Ser. No. 09/369,707.

B. Audio-visual Speaker Recognition

Figure 6:
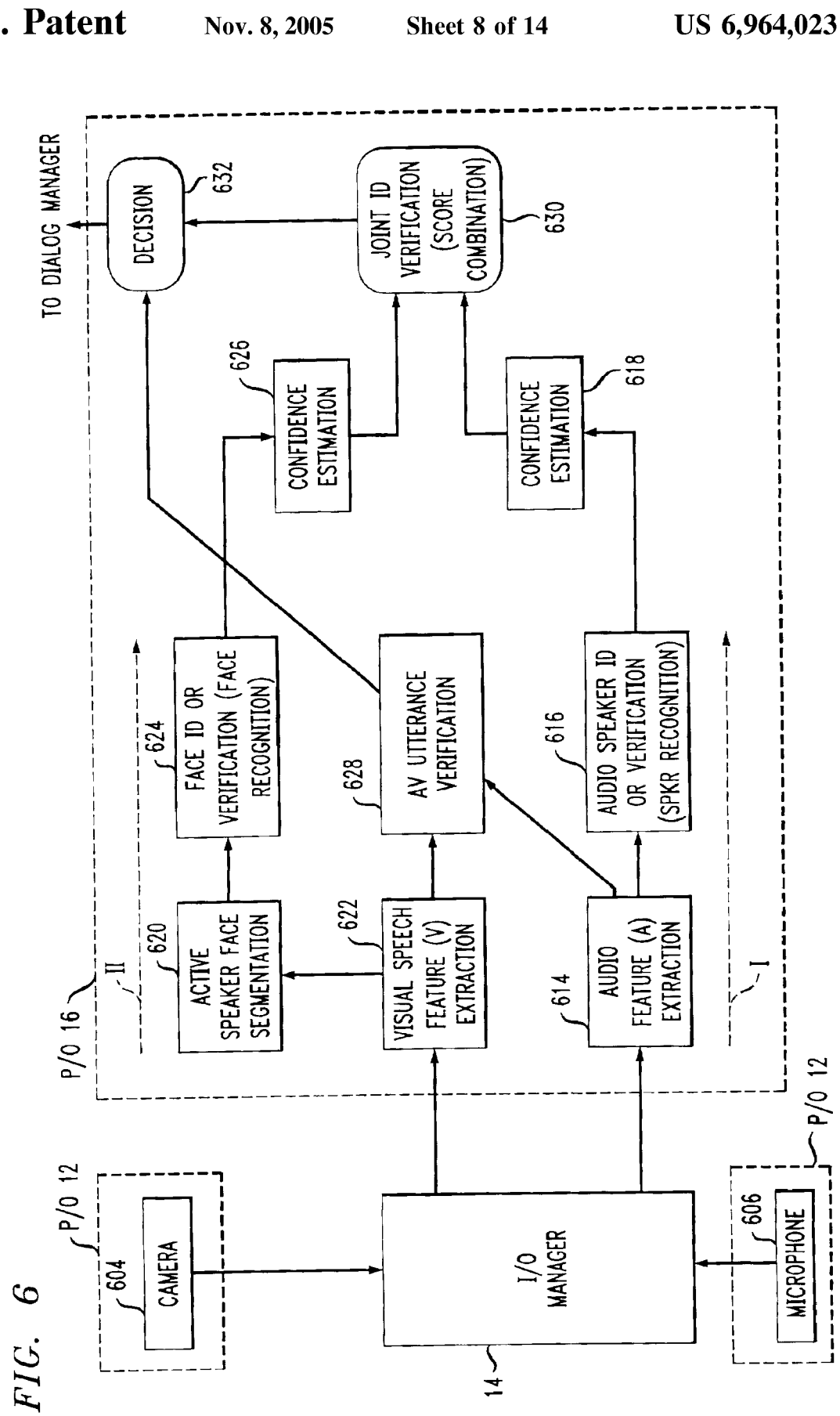
FIG. 6 is a block diagram illustrating an audio-visual speaker recognition module for use according to an embodiment of the present invention.

Referring now to FIG. 6, a block diagram illustrates a preferred embodiment of an audio-visual speaker recognition module that may be employed as one of the recognition modules of FIG. 1 to perform speaker recognition using multi-modal input data received in accordance with the invention. It is to be appreciated that such an audio-visual speaker recognition module is disclosed in the above-referenced U.S. patent application identified as Ser. No. 09/369,706, filed on Aug. 6, 1999 and entitled "Methods And Apparatus for Audio-Visual Speaker Recognition and Utterance Verification." A description of one of the embodiments of such an audio-visual speaker recognition module for use in a preferred embodiment of the multi-modal conversational computing system of the invention is provided below in this section. However, it is to be appreciated that other mechanisms for performing speaker recognition may be employed.

The audio-visual speaker recognition and utterance verification module shown in FIG. 6 uses a decision fusion approach. Like the audio-visual speech recognition module of FIG. 4, the speaker recognition module of FIG. 6 may receive the same types of arbitrary content video from the camera 604 and audio from the microphone 606 via the I/O manager 14. While the camera and microphone have different reference numerals in FIG. 6 than in FIG. 4, it is to be appreciated that they may be the same camera and microphone.

A phantom line denoted by Roman numeral I represents the processing path the audio information signal takes within the module, while a phantom line denoted by Roman numeral II represents the processing path the video information signal takes within the module. First, the audio signal path I will be discussed, then the video signal path II, followed by an explanation of how the two types of information are combined to provide improved speaker recognition accuracy.

The module includes an auditory feature extractor 614. The feature extractor 614 receives an audio or speech signal and, as is known in the art, extracts spectral features from the signal at regular intervals. The spectral features are in the form of acoustic feature vectors (signals) which are then passed on to an audio speaker recognition module 616. Before acoustic vectors are extracted, the speech signal may be sampled at a rate of 16 kilohertz (kHz). A frame may consist of a segment of speech having a 25 millisecond (msec) duration. In such an arrangement, the extraction process preferably produces 24 dimensional acoustic cepstral vectors via the process described below. Frames are advanced every 10 msec to obtain succeeding acoustic vectors. Of course, other front-ends may be employed.

First, in accordance with a preferred acoustic feature extraction process, magnitudes of discrete Fourier transforms of samples of speech data in a frame are considered in a logarithmically warped frequency scale. Next, these amplitude values themselves are transformed to a logarithmic scale. The latter two steps are motivated by a logarithmic sensitivity of human hearing to frequency and amplitude. Subsequently, a rotation in the form of discrete cosine transform is applied. One way to capture the dynamics is to use the delta (first-difference) and the delta-delta (second-order differences) information. An alternative way to capture dynamic information is to append a set of (e.g., four) preceding and succeeding vectors to the vector under consideration and then project the vector to a lower dimensional space, which is chosen to have the most discrimination. The latter procedure is known as Linear Discriminant Analysis (LDA) and is well known in the art. It is to be understood that other variations on features may be used, e.g., LPC cepstra, PLP, etc., and that the invention is not limited to any particular type.

After the acoustic feature vectors, denoted in FIG. 6. by the letter A, are extracted, they are provided to the audio speaker recognition module 616. It is to be understood that the module 616 may perform speaker identification and/or speaker verification using the extracted acoustic feature vectors. The processes of speaker identification and verification may be accomplished via any conventional acoustic information speaker recognition system. For example, speaker recognition module 616 may implement the recognition techniques described in the U.S. patent application identified by Ser. No. 08/788,471, filed on Jan. 28, 1997, and entitled: "Text Independent Speaker Recognition for Transparent Command Ambiguity Resolution and Continuous Access Control," the disclosure of which is incorporated herein by reference.

An illustrative speaker identification process for use in module 616 will now be described. The illustrative system is disclosed in H. Beigi, S. H. Maes, U. V. Chaudari and J. S. Sorenson, "IBM model-based and frame-by-frame speaker recognition," Speaker Recognition and its Commercial and Forensic Applications, Avignon, France 1998. The illustrative speaker identification system may use two techniques: a model-based approach and a frame-based approach. In the experiments described herein, we use the frame-based approach for speaker identification based on audio. The frame-based approach can be described in the following manner.

Let $M_i$ be the model corresponding to the ith enrolled speaker. $M_i$ is represented by a mixture Gaussian model defined by the parameter set $\{\mu_{i,j}, \Sigma_{i,j}, p_{i,j}\}_{j=1,\ldots,n_i}$, consisting of the mean vector, covariance matrix and mixture weights for each of the $n_i$ components of speaker i's model. These models are created using training data consisting of a sequence of K frames of speech with d-dimensional cepstral feature vectors, $\{f_m\}m=1, \ldots K$. The goal of speaker identification is to find the model, $M_i$, that best explains the test data represented by a sequence of N frames, $\{f_n\}n=1, \ldots N$. We use the following frame-based weighted likelihood distance measure, $d_{i,n}$, in making the decision:

$$d_{i,n} = -\log\left[\sum_{j=1}^{n_i} p_{i,j} p(f_n | \mu_{i,j}, \Sigma_{i,j})\right].$$

The total distance $D_i$ of model $M_i$ from the test data is then taken to be the sum of the distances over all the test frames:

$$D_i = \sum_{n=1}^{N} d_{i,n}.$$

Thus, the above approach finds the closest matching model and the person whose model that represents is determined to be the person whose utterance is being processed.

Speaker verification may be performed in a similar manner, however, the input acoustic data is compared to determine if the data matches closely enough with stored models. If the comparison yields a close enough match, the person uttering the speech is verified. The match is accepted or rejected by comparing the match with competing models. These models can be selected to be similar to the claimant speaker or be speaker independent (i.e., a single or a set of speaker independent models). If the claimant wins and wins with enough margin (computed at the level of the likelihood or the distance to the models), we accept the claimant. Otherwise, the claimant is rejected. It should be understood that, at enrollment, the input speech is collected for a speaker to build the mixture gaussian model $M_i$ that characterize each speaker.

Referring now to the video signal path II of FIG. 6, the methodologies of processing visual information will now be explained. The audio-visual speaker recognition and utterance verification module includes an active speaker face segmentation module 620 and a face recognition module 624. The active speaker face segmentation module 620 receives video input from camera 604. It is to be appreciated that speaker face detection can also be performed directly in the compressed data domain and/or from audio and video information rather than just from video information. In any case, segmentation module 620 generally locates and tracks the speaker's face and facial features within the arbitrary video background. This will be explained in detail below. From data provided from the segmentation module 622, an identification and/or verification operation may be performed by recognition module 624 to identify and/or verify the face of the person assumed to be the speaker in the video. Verification can also be performed by adding score thresholding or competing models. Thus, the visual mode of speaker identification is implemented as a face recognition system where faces are found and tracked in the video sequences, and recognized by comparison with a database of candidate face templates. As will be explained later, utterance verification provides a technique to verify that the person actually uttered the speech used to recognize him.

Face detection and recognition may be performed in a variety of ways. For example, in an embodiment employing an infrared camera 604, face detection and identification may be performed as disclosed in Francine J. Prokoski and Robert R. Riedel, "Infrared Identification of Faces and Body Parts," BIOMETRICS, Personal Identification in Networked Society, Kluwer Academic Publishers, 1999. In a preferred embodiment, techniques described in Andrew Senior, "Face and feature finding for face recognition system," $2^{nd}$ Int. Conf. On Audio-Video based Biometric Person Authentication, Washington D.C., March 1999 are employed. The following is an illustrative description of face detection and recognition as respectively performed by segmentation module 622 and recognition module 624.

Face Detection

Faces can occur at a variety of scales, locations and orientations in the video frames. In this system, we make the assumption that faces are close to the vertical, and that there is no face smaller than 66 pixels high. However, to test for a face at all the remaining locations and scales, the system searches for a fixed size template in an image pyramid. The image pyramid is constructed by repeatedly down-sampling the original image to give progressively lower resolution representations of the original frame. Within each of these sub-images, we consider all square regions of the same size as our face template (typically 11×11 pixels) as candidate face locations. A sequence of tests is used to test whether a region contains a face or not.

First, the region must contain a high proportion of skin-tone pixels, and then the intensities of the candidate region are compared with a trained face model. Pixels falling into a pre-defined cuboid of hue-chromaticity-intensity space are deemed to be skin tone, and the proportion of skin tone pixels must exceed a threshold for the candidate region to be considered further.

The face model is based on a training set of cropped, normalized, grey-scale face images. Statistics of these faces are gathered and a variety of classifiers are trained based on these statistics. A Fisher linear discriminant (FLD) trained with a linear program is found to distinguish between faces and background images, and "Distance from face space" (DFFS), as described in M. Turk and A. Pentland, "Eigenfaces for Recognition," Journal of Cognitive Neuro Science, vol. 3, no. 1, pp. 71–86, 1991, is used to score the quality of faces given high scores by the first method. A high combined score from both these face detectors indicates that the candidate region is indeed a face. Candidate face regions with small perturbations of scale, location and rotation relative to high-scoring face candidates are also tested and the maximum scoring candidate among the perturbations is chosen, giving refined estimates of these three parameters.

In subsequent frames, the face is tracked by using a velocity estimate to predict the new face location, and models are used to search for the face in candidate regions near the predicted location with similar scales and rotations. A low score is interpreted as a failure of tracking, and the algorithm begins again with an exhaustive search.

Face Recognition

Having found the face, K facial features are located using the same techniques (FLD and DFFS) used for face detection. Features are found using a hierarchical approach where large-scale features, such as eyes, nose and mouth are first found, then sub-features are found relative to these features. As many as 29 sub-features are used, including the hairline, chin, ears, and the corners of mouth, nose, eyes and eyebrows. Prior statistics are used to restrict the search area for each feature and sub-feature relative to the face and feature positions, respectively. At each of the estimated sub-feature locations, a Gabor Jet representation, as described in L. Wiskott and C. von der Malsburg, "Recognizing Faces by Dynamic Link Matching," Proceedings of the International Conference on Artificial Neural Networks, pp. 347–352, 1995, is generated. A Gabor jet is a set of two-dimensional Gabor filters—each a sine wave modulated by a Gaussian. Each filter has scale (the sine wavelength and Gaussian standard deviation with fixed ratio) and orientation (of the sine wave). We use five scales and eight orientations, giving 40 complex coefficients (a(j),j=1, . . . , 40) at each feature location.

A simple distance metric is used to compute the distance between the feature vectors for trained faces and the test candidates. The distance between the $i^{th}$ trained candidate and a test candidate for feature k is defined as:

$$S_{ik} = \frac{\sum_j a(j) a_i(j)}{\sqrt{\sum_j a(j)^2 \sum_j a_i(j)^2}}.$$

A simple average of these similarities, $$S_i = 1/K \sum_1^K S_{ik},$$

gives an overall measure for the similarity of the test face to the face template in the database. Accordingly, based on the similarity measure, an identification and/or verification of the person in the video sequence under consideration is made.

Next, the results of the face recognition module 624 and the audio speaker recognition module 616 are provided to respective confidence estimation blocks 626 and 618 where confidence estimation is performed. Confidence estimation refers to a likelihood or other confidence measure being determined with regard to the recognized input. In one embodiment, the confidence estimation procedure may include measurement of noise levels respectively associated with the audio signal and the video signal. These levels may be measured internally or externally with respect to the system. A higher level of noise associated with a signal generally means that the confidence attributed to the recognition results associated with that signal is lower. Therefore, these confidence measures are taken into consideration during the weighting of the visual and acoustic results discussed below.

Given the audio-based speaker recognition and face recognition scores provided by respective modules 616 and 624, audio-visual speaker identification/verification may be performed by a joint identification/verification module 630 as follows. The top N scores are generated-based on both audio and video-based identification techniques. The two lists are combined by a weighted sum and the best-scoring candidate is chosen. Since the weights need only to be defined up to a scaling factor, we can define the combined score $S_i^{av}$ as a function of the single parameter $\alpha$:

$S_i^{av} = \cos \alpha D_i + \sin \alpha S_i$.

The mixture angle $\alpha$ has to be selected according to the relative reliability of audio identification and face identification. One way to achieve this is to optimize α in order to maximize the audio-visual accuracy on some training data. Let us denote by $D_i(n)$ and $S_i(n)$ as the audio ID (identification) and video ID score for the $i^{th}$ enrolled speaker (i=1 . . . P) computed on the $n^{th}$ training clip. Let us define the variable $T_i(n)$ as zero when the $n^{th}$ clip belongs to the $i^{th}$ speaker and one otherwise. The cost function to be minimized is the empirical error, as discussed in V. N. Vapnik, "The Nature of Statistical Learning Theory, Springer, 1995, that can be written as:

$$C(\alpha) = \frac{1}{N}\sum_{n=1}^{N} T_{\hat{i}}(n) \text{ where } \hat{i} = \arg\max_{i} S_i^{av}(n),$$

and where:

$$S_i^{av}(n) = \cos\alpha D_i(n) + \sin\alpha S_i(n).$$

In order to prevent over-fitting, one can also resort to the smoothed error rate, as discussed in H. Ney, "On the Probabilistic Interpretation of Neural Network Classification and Discriminative Training Criteria," IEEE Transactions on Pattern Analysis and Machine Intelligence," vol. 17, no. 2, pp. 107–119, 1995, defined as:

$$C'(\alpha) = \frac{1}{N}\sum_{n=1}^{N}\sum_{i} T_i(n) \frac{\exp^{\eta S_i^{av}(n)}}{\sum_{j=1}^{P} \exp^{\eta S_j^{av}(n)}}.$$

When η is large, all the terms of the inner sum approach zero, except for i=î, and C'(α) approaches the raw error count C(α) Otherwise, all the incorrect hypotheses (those for which $T_i(n)=1$) have a contribution that is a decreasing function of the distance between their score and the maximum score. If the best hypothesis is incorrect, it has the largest contribution. Hence, by minimizing the latter cost function, one tends to maximize not only the recognition accuracy on the training data, but also the margin by which the best score wins. This function also presents the advantage of being differentiable, which can facilitate the optimization process when there is more than one parameter.

The audio-visual speaker recognition module of FIG. 6 provides another decision or score fusion technique derived by the previous technique, but which does not require any training. It consists in selecting at testing time, for each clip, the value of α in a given range which maximizes the difference between the highest and the second highest scores. The corresponding best hypothesis I(n) is then chosen. We have:

$$\hat{\alpha}(n) = \arg\max_{\alpha_1 < \alpha_2 < \alpha_3}\left[\max_{i} S_i^{av}(n) - 2\text{nd}\max_{i} S_i^{av}(n)\right],$$

and $$I(n) = \arg\max_{i}[\cos\hat{\alpha}(n)D_i(n) + \sin\hat{\alpha}(n)S_i(n)].$$

The values of $\alpha_1$ and $\alpha_2$ should be restricted to the interval $$\left[0 \ldots \frac{\Pi}{2}\right].$$

The rationale of this technique is the following. In the $\{D_i, S_i\}$ plane, the point corresponding to the correct decision is expected to lie apart from the others. The fixed linear weights assume that the "direction" where this point can be found relative to the others is always the same, which is not necessarily true. The equation relating to $\hat{\alpha}(n)$ and I(n) above find the point which lies farthest apart from the others in any direction between $\alpha_1$ and $\alpha_2$.

Another interpretation is that the distance between the best combined score and the second best is an indicator of the reliability of the decision. The method adaptively chooses the weights which maximize that confidence measure.

Thus, the joint identification/verification module 630 makes a decision with regard to the speaker. In a verification scenario, based on one of the techniques described above, a decision may be made to accept the speaker if he is verified via both the acoustic path and the visual path. However, he may be rejected if he is only verified through one of the paths. In an identification scenario, for example, the top three scores from the face identification process may be combined with the top three scores from the acoustic speaker identification process. Then, the highest combined score is identified as the speaker.

In a preferred embodiment, before the module makes a final disposition with respect to the speaker, the system performs an utterance verification operation. It is to be appreciated that utterance verification is performed by the utterance verification module 628 (FIG. 6) based on input from the acoustic feature extractor 614 and a visual speech feature extractor 622. Before describing utterance verification, a description of illustrative techniques for extracting visual speech feature vectors will follow. Particularly, the visual speech feature extractor 622 extracts visual speech feature vectors (e.g., mouth or lip-related parameters), denoted in FIG. 6 as the letter V, from the face detected in the video frame by the active speaker face segmentation module 620.

Examples of visual speech features that may be extracted are grey scale parameters of the mouth region; geometric/model based parameters such as area, height, width of mouth region; lip contours arrived at by curve fitting, spline parameters of inner/outer contour; and motion parameters obtained by three dimensional tracking. Still another feature set that may be extracted via module 622 takes into account the above factors. Such technique is known as Active Shape modeling and is described in Iain Matthews, "Features for audio visual speech recognition," Ph.D dissertation, School of Information Systems, University of East Angalia, January 1998.

Thus, while the visual speech feature extractor 622 may implement one or more known visual feature extraction techniques, in one embodiment, the extractor extracts grey scale parameters associated with the mouth region of the image. Given the location of the lip corners, after normalization of scale and rotation, a rectangular region containing the lip region at the center of the rectangle is extracted from the original decompressed video frame. Principal Component Analysis (PCA), as is known, may be used to extract a vector of smaller dimension from this vector of grey-scale values.

Another method of extracting visual feature vectors that may be implemented in module 622 may include extracting geometric features. This entails extracting the phonetic/visemic information from the geometry of the lip contour and its time dynamics. Typical parameters may be the mouth corners, the height or the area of opening, the curvature of inner as well as the outer lips. Positions of articulators, e.g., teeth and tongue, may also be feature parameters, to the extent that they are discernible by the camera.

The method of extraction of these parameters from grey scale values may involve minimization of a function (e.g., a cost function) that describes the mismatch between the lip contour associated with parameter values and the grey scale image. Color information may be utilized as well in extracting these parameters.

From the captured (or demultiplexed and decompressed) video stream one performs a boundary detection, the ultimate result of which is a parameterized contour, e.g., circles, parabolas, ellipses or, more generally, spline contours, each of which can be described by a finite set of parameters.

Still other features that can be extracted include two or three dimensional wire-frame model-based techniques of the type used in the computer graphics for the purposes of animation. A wire-frame may consist of a large number of triangular patches. These patches together give a structural representation of the mouth/lip/jaw region, each of which contain useful features in speech-reading. These parameters could also be used in combination with grey scale values of the image to benefit from the relative advantages of both schemes.

Given the extracted visual speech feature vectors (V) from extractor 622 and the acoustic feature vectors(A) from extractor 614, the AV utterance verifier 628 performs verification. Verification may involve a comparison of the resulting likelihood, for example, of aligning the audio on a random sequence of visemes. As is known, visemes, or visual phonemes, are generally canonical mouth shapes that accompany speech utterances which are categorized and pre-stored similar to acoustic phonemes. A goal associated with utterance verification is to make a determination that the speech used to verify the speaker in the audio path I and the visual cues used to verify the speaker in the video path II correlate or align. This allows the system to be confident that the speech data that is being used to recognize the speaker is actually what the speaker uttered. Such a determination has many advantages. For example, from the utterance verification, it can be determined whether the user is lip synching to a pre-recorded tape playback to attempt to fool the system. Also, from utterance verification, errors in the audio decoding path may be detected. Depending on the number of errors, a confidence measure may be produced and used by the system.

Figure 7:
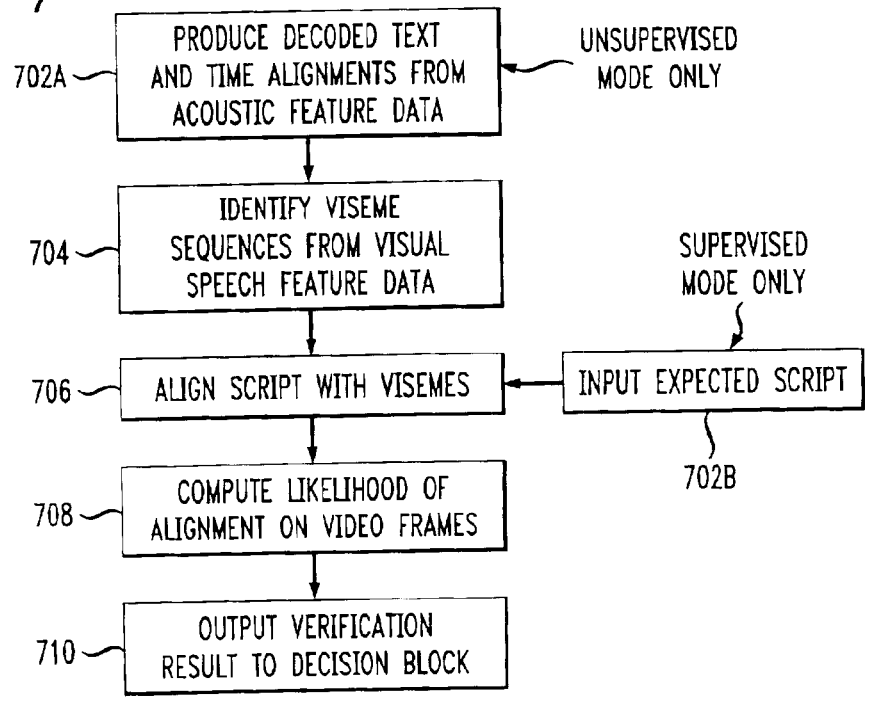
FIG. 7 is a flow diagram of an utterance verification methodology for use according to an embodiment of the present invention.

Referring now to FIG. 7, a flow diagram of an utterance verification methodology is shown. Utterance verification may be performed in: (i) a supervised mode, i.e., when the text (script) is known and available to the system; or (ii) an unsupervised mode, i.e., when the text (script) is not known and available to the system.

Thus, in step 702A (unsupervised mode), the uttered speech to be verified may be decoded by classical speech recognition techniques so that a decoded script and associated time alignments are available. This is accomplished using the feature data from the acoustic feature extractor 614. Contemporaneously, in step 704, the visual speech feature vectors from the visual feature extractor 622 are used to produce a visual phonemes or visemes sequence.

Next, in step 706, the script is aligned with the visemes. A rapid (or other) alignment may be performed in a conventional manner in order to attempt to synchronize the two information streams. For example, in one embodiment, rapid alignment as disclosed in the U.S. patent application identified by Ser. No. 09/015,150 and entitled "Apparatus and Method for Generating Phonetic Transcription from Enrollment Utterances," the disclosure of which is incorporated by reference herein, may be employed. Note that in a supervised mode, step 702B replaces step 702A such that the expected or known script is aligned with the visemes in step 706, rather than the decoded version of the script. Then, in step 708, a likelihood on the alignment is computed to determine how well the script aligns to the visual data. The results of the likelihood are then provided to a decision block 632 which, along with the results of the score module 630, decides on a final disposition of the speaker, e.g., accept him or reject him. This may be used to allow or deny access to a variety of devices, applications, facilities, etc.

So, in the unsupervised utterance verification mode, the system is able to check that the user is indeed speaking rather than using a playback device and moving his lips. Also, a priori, errors may be detected in the audio decoding. In the supervised mode, the system is able to prove that the user uttered the text if the recognized text is sufficiently aligned or correlated to the extracted lip parameters.

It is to be appreciated that utterance verification in the unsupervised mode can be used to perform speech detection as disclosed in the above-referenced U.S. patent application identified as U.S. Ser. No. 09/369,707. Indeed, if acoustic and visual activities are detected, they can be verified against each other. When the resulting acoustic utterance is accepted, the system considers that speech is detected. Otherwise, it is considered that extraneous activities are present.

It is to be appreciated that the audio-visual speaker recognition module of FIG. 6 may employ the alternative embodiments of audio-visual speaker recognition described in the above-referenced U.S. patent application identified as Ser. No. 09/369,706. For instance, whereas the embodiment of FIG. 6 illustrates a decision or score fusion approach, the module 20 may employ a feature fusion approach and/or a serial rescoring approach, as described in the above-referenced U.S. patent application identified as Ser. No. 09/369,706.

It is to be further appreciated that the output of the audio-visual speaker recognition system of FIG. 6 is provided to the dialog manager 18 of FIG. 1 for use in disambiguating the user's intent, as explained above.

C. Conversational Virtual Machine

Figure 8A:
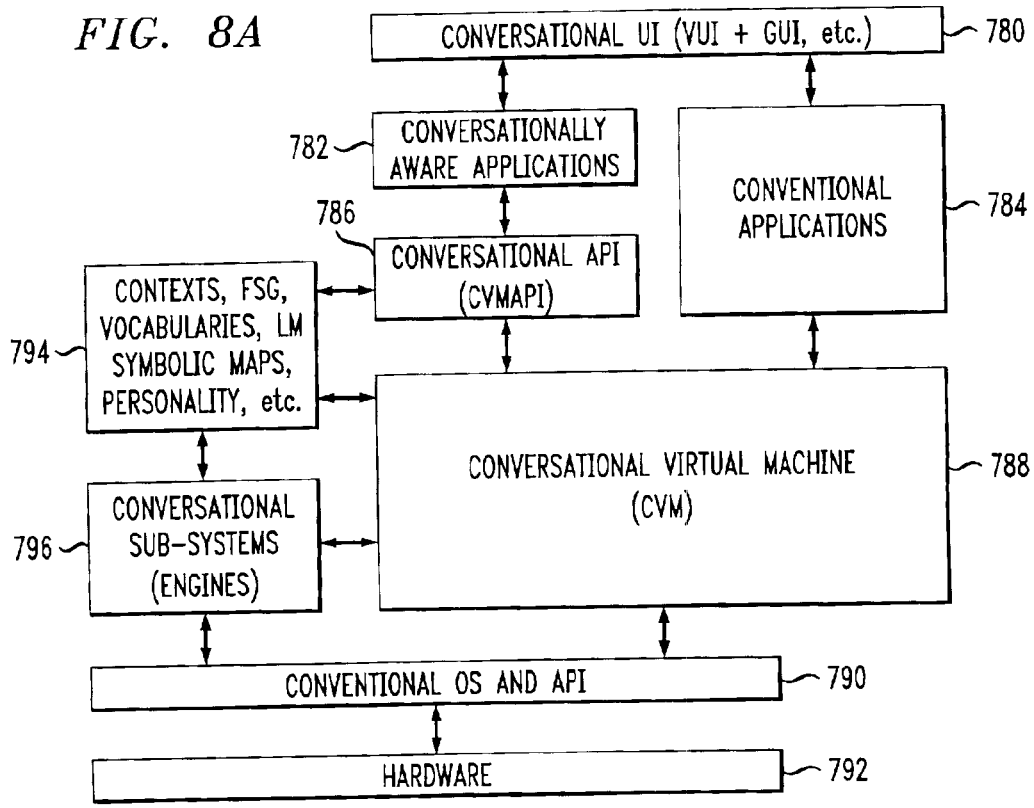
FIGS. 8A and 8B are block diagrams illustrating a conversational computing system for use according to an embodiment of the present invention.
Figure 8B:
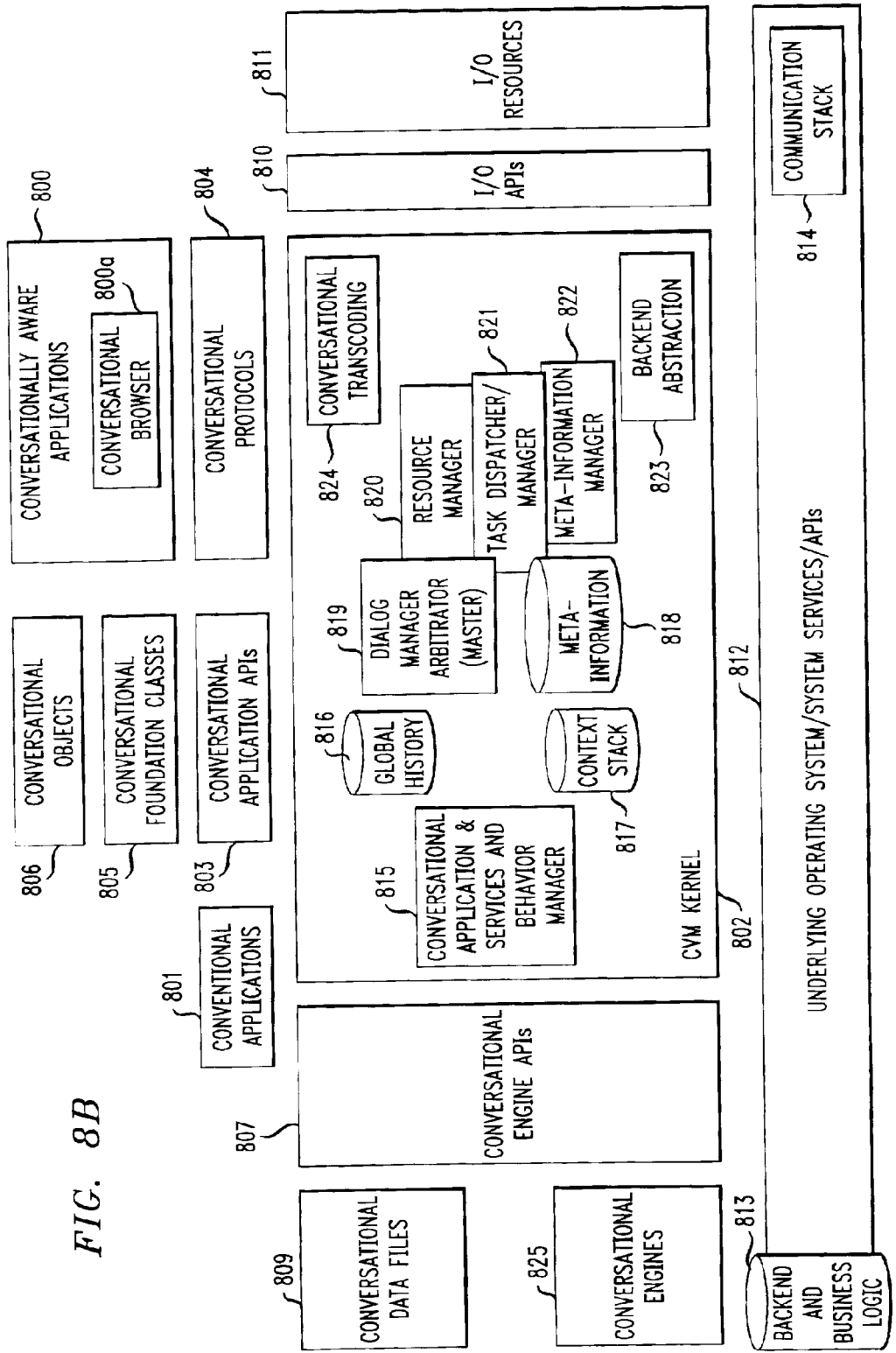

Referring now to FIGS. 8A and 8B, block diagrams illustrate a preferred embodiment of a conversational virtual machine (CVM). It is to be appreciated that such a conversational virtual machine is disclosed in the above-referenced PCT international patent application identified as US99/22927 filed on Oct. 1, 1999 and entitled "Conversational Computing Via Conversational Virtual Machine." A description of one of the embodiments of such a machine for use in a preferred embodiment of the multi-modal conversational computing system of the present invention is provided below in this section. However, it is to be appreciated that other mechanisms for implementing conversational computing according to the invention may be employed, as explained below.

It is to be understood that the CVM described below may be employed to provide a framework for: portions of the I/O subsystem 12; I/O manager 14; recognition engines 16; dialog manager 18; and context stack 20 of FIG. 1. Throughout the description of the CVM below, the components of the CVM that may be employed to implement these functional components of FIG. 1 will be noted. However, while the CVM may be used because of its ability to implement an I/O manager, a modality independent context manager (context stack), a dialog manager (when disambiguation is performed), a classifier (when mood or focus is determined), required engines and APIs/interfaces to the dialog manager to run applications, it is important to note that other mechanisms may be alternatively used to implement these functional components of a multi-modal conversational computing system of the invention. For example, functional components of a multi-modal conversational computing system of the invention may be implemented through a browser that carries these functions, an OSS (operating system service) layer, a VM (virtual machine) or even just an application that implements all these functionalities, possibly without explicitly identifying these component but rather by implementing hard-coded equivalent services. It is also to be appreciated that the implementation may support only modalities of speech and video and, in such a case, does not need to support other modalities (e.g., handwriting, GUI, etc.).

Thus, the CVM may be employed as a main component for implementing conversational computing according to the conversational computing paradigm described above with respect to the present invention. In one embodiment, the CVM is a conversational platform or kernel running on top of a conventional OS (operating system) or RTOS (real-time operating system). A CVM platform can also be implemented with PvC (pervasive computing) clients as well as servers and can be distributed across multiple systems (clients and servers). In general, the CVM provides conversational APIs (application programming interfaces) and protocols between conversational subsystems (e.g., speech recognition engine, text-to speech, etc.) and conversational and/or conventional applications. The CVM may also provide backward compatibility to existing applications, with a more limited interface. As discussed in detail below, the CVM provides conversational services and behaviors as well as conversational protocols for interaction with multiple applications and devices also equipped with a CVM layer, or at least, conversationally aware.

It is to be understood that the different elements and protocol/APIs described herein are defined on the basis of the function that they perform or the information that they exchange. Their actual organization or implementation can vary, e.g., implemented by a same or different entity, being implemented as a component of a larger component or as an independently instantiated object or a family of such objects or classes.

A CVM (or operating system) based on the conversational computing paradigm described herein allows a computer or any other interactive device to converse with a user. The CVM further allows the user to run multiple tasks on a machine regardless if the machine has no display or GUI capabilities, nor any keyboard, pen or pointing device. Indeed, the user can manage these tasks like a conversation and bring a task or multiple simultaneous tasks, to closure. To manage tasks like a conversation, the CVM affords the capability of relying on mixed initiatives, contexts and advanced levels of abstraction, to perform its various functions. Mixed initiative or free flow navigation allows a user to naturally complete, modify, or correct a request via dialog with the system. Mixed initiative also implies that the CVM can actively help (take the initiative to help) and coach a user through a task, especially in speech-enabled applications, wherein the mixed initiative capability is a natural way of compensating for a display-less system or system with limited display capabilities. In general, the CVM complements conventional interfaces and user input/output rather than replacing them. This is the notion of "multi-modality" whereby speech, and video as described above, may be used in parallel with a mouse, keyboard, and other input devices such as a pen. Conventional interfaces can be replaced when device limitations constrain the implementation of certain interfaces. In addition, the ubiquity and uniformity of the resulting interface across devices, tiers and services is an additional mandatory characteristic. It is to be understood that a CVM system can, to a large extent, function with conventional input and/or output media. Indeed, a computer with classical keyboard inputs and pointing devices coupled with a traditional monitor display can profit significantly by utilizing the CVM. One example is described in U.S. patent application identified as U.S. Ser. No. 09/507,526 filed on Feb. 18, 2000 and entitled "Multi-Modal Shell" which claims priority to U.S. provisional patent application identified as U.S. Ser. No. 60/128,081 filed on Apr. 7, 1999 and U.S. provisional patent application identified by Ser. No. 60/158,777 filed on Oct. 12, 1999, the disclosures of which are incorporated by reference herein (which describes a method for constructing a true multi-modal application with tight synchronization between a GUI modality and a speech modality). In other words, even users who do not want to talk to their computer can also realize a dramatic positive change to their interaction with the CVM enabled machine.

Referring now to FIG. 8A, a block diagram illustrates a CVM system according to a preferred embodiment, which may be implemented on a client device or a server. In terms of the vehicle example above, this means that the components of the system 10 may be located locally (in the vehicle), remotely (e.g., connected wirelessly to the vehicle), or some combination thereof. In general, the CVM provides a universal coordinated multi-modal conversational user interface (CUI) 780. The "multi-modality" aspect of the CUI implies that various I/O resources such as voice, keyboard, pen, and pointing device (mouse), keypads, touch screens, etc., and video as described above, can be used in conjunction with the CVM platform. The "universality" aspect of the CUI implies that the CVM system provides the same UI (user interface) to a user whether the CVM is implemented in connection with a desktop computer, a PDA with limited display capabilities, or with a phone where no display is provided. In other words, universality implies that the CVM system can appropriately handle the UI of devices with capabilities ranging from speech only to multi-modal, i.e., speech + GUI, to purely GUI. As per the present invention, the system may be extended to include video input data as well. Therefore, the universal CUI provides the same UI for all user interactions, regardless of the access modality.

Moreover, the concept of universal CUI extends to the concept of a coordinated CUI. In particular, assuming a plurality of devices (within or across multiple computer tiers) offer the same CUI, they can be managed through a single discourse—i.e., a coordinated interface. That is, when multiple devices are conversationally connected (i.e., aware of each other), it is possible to simultaneously control them through one interface (e.g., single microphone). For example, voice can automatically control via a universal coordinated CUI a smart phone, a pager, a PDA (personal digital assistant), networked computers, IVR (interactive voice response) and a car embedded computer that are conversationally connected. These CUI concepts will be explained in greater detail below.

The CVM system can run a plurality of applications including conversationally aware applications 782 (i.e., applications that "speak" conversational protocols) and conventional applications 784. The conversationally aware applications 782 are applications that are specifically programmed for operating with a CVM core layer (or kernel) 788 via conversational application APIs 786. In general, the CVM kernel 788 controls the dialog across applications and devices on the basis of their registered conversational capabilities and requirements and provides a unified conversational user interface which goes far beyond adding speech as I/O modality to provide conversational system behaviors. The CVM system may be built on top of a conventional OS and APIs 790 and conventional device hardware 792 and located on a server or any client device (PC, PDA, PvC). The conventional applications 784 are managed by the CVM kernel layer 788 which is responsible for accessing, via the OS APIs, GUI menus and commands of the conventional applications as well as the underlying OS commands. The CVM automatically handles all the input/output issues, including the conversational subsystems 796 (i.e., conversational engines) and conventional subsystems (e.g., file system and conventional drivers) of the conventional OS 790. In general, conversational sub-systems 796 are responsible for converting voice requests into queries and converting outputs and results into spoken messages using the appropriate data files 794 (e.g., contexts, finite state grammars, vocabularies, language models, symbolic query maps, etc.). The conversational application API 786 conveys all the information for the CVM 788 to transform queries into application calls and conversely converts output into speech, appropriately sorted before being provided to the user.

Referring now to FIG. 8B, a diagram illustrates abstract programming layers of a CVM according to a preferred embodiment. The abstract layers of the CVM comprise conversationally aware applications 800 and conventional applications 801 that can run on top of the CVM. An application that relies on multi-modal disambiguation is an example of such a conversational application that executes on top of the CVM. Similarly, an application that exploits focus information or mood can be considered as a conversational application on top of the CVM. These applications are the programs that are executed by the system to provide the user with the interaction he desires within the environment in which the system is deployed. As discussed above, the conversationally aware applications 800 interact with a CVM kernel layer 802 via a conversational application API layer 803. The conversational application API layer 803 encompasses conversational programming languages/scripts and libraries (conversational foundation classes) to provide the various features offered by the CVM kernel 802. For example, the conversational programming languages/scripts provide the conversational APIs that allow an application developer to hook (or develop) conversationally aware applications 800. They also provide the conversational API layer 803, conversational protocols 804 and system calls that allow a developer to build the conversational features into an application to make it "conversationally aware." The code implementing the applications, API calls and protocol calls includes interpreted and compiled scripts and programs, with library links, conversational logic engine call and conversational foundation classes.

More specifically, the conversational application API layer 803 comprises a plurality of conversational foundation classes 805 (or fundamental dialog components) which are provided to the application developer through library functions that may be used to build a CUI or conversationally aware applications 800. The conversational foundation classes 805 are the elementary components or conversational gestures (as described by T. V. Raman, in "Auditory User Interfaces, Toward The Speaking Computer," Kluwer Academic Publishers, Boston 1997) that characterize any dialog, independently of the modality or combination of modalities (which can be implemented procedurally or declaratively). The conversational foundation classes 805 comprise CUI building blocks and conversational platform libraries, dialog modules and components, and dialog scripts and beans. The conversational foundation classes 805 may be compiled locally into conversational objects 806. More specifically, the conversational objects 805 (or dialog components) are compiled from the conversational foundation classes 805 (fundamental dialog components) by combining the different individual classes in a code calling these libraries through a programming language such as Java or C++.

As noted above, coding comprises embedding such fundamental dialog components into declarative code or linking them to imperative code. Nesting and embedding of the conversational foundation classes 805 allows the conversational object 806 (either reusable or not) to be constructed (either declaratively or via compilation/interpretation) for performing specific dialog tasks or applications. Note that CFC (Conversational Foundation Classes) or CML is not the only way to program the CVM. Any programming language that interfaces to the applications APIs and protocols would fit. The conversational objects 806 may be implemented declaratively such as pages of CML (conversational markup language) (nested or not) which are processed or loaded by a conversational browser (or viewer) (800*a*) as disclosed in the PCT patent application identified as PCT/US99/23008 filed on Oct. 1, 1999 and entitled "Conversational Browser and Conversational Systems," which is incorporated herein by reference. The dialog objects comprise applets or objects that may be loaded through CML (conversational markup language) pages (via a conversational browser), imperative objects on top of CVM (possibly distributed on top of the CVM), script tags in CML, and servlet components.

Some examples of conversational gestures that may be implemented are as follows. A conversational gesture message is used by a machine to convey informational messages to the user. The gesture messages will typically be rendered as a displayed string or spoken prompt. Portions of the message to be spoken can be a function of the current state of the various applications/dialogs running on top of the CVM. A conversational gesture "select from set" is used to encapsulate dialogues where the user is expected to pick from a set of discrete choices. It encapsulates the prompt, the default selection, as well as the set of legal choices. Conversational gesture message "select from range" encapsulates dialogs where the user is allowed to pick a value from a continuous range of values. The gesture encapsulates the valid range, the current selection, and an informational prompt. In addition, conversational gesture input is used to obtain user input when the input constraints are more complex (or perhaps non-existent). The gesture encapsulates the user prompt, application-level semantics about the item of information being requested and possibly a predicate to test the validity of the input. As described above, however, the conversational foundation classes include, yet surpass, the concept of conversational gestures (i.e., they extend to the level of fundamental behavior and services as well as rules to perform conversational tasks).

As discussed below, a programming model allows the connection between a master dialog manager and engines through conversational APIs. It is to be understood that such a master dialog manager may be implemented as part of the dialog manager 18 of FIG. 1, while the engines would include the one or more recognition engines of FIG. 1. Data files of the foundation classes, as well as data needed by any recognition engine (e.g., grammar, acoustic models, video patterns, etc.), are present on CVM (loadable for embedded platforms or client platforms). Data files of objects can be expanded and loaded.

The development environment offered by the CVM is referred to herein as SPOKEN AGE™. Spoken Age allows a developer to build, simulate and debug conversationally aware applications for CVM. Besides offering direct implementation of the API calls, it offers also tools to build advanced conversational interfaces with multiple personalities, voice fonts which allow the user to select the type of voice providing the output, and conversational formatting languages which build conversational presentations like Postcript and AFL (audio formatting languages).

As described above, the conversational application API layer 803 encompasses conversational programming languages and scripts to provide universal conversational input and output, conversational logic and conversational meta-information exchange protocols. The conversational programming language/scripts allow to use any available resources as input or output stream. Using the conversational engines 808 (recognition engines 16 of FIG. 1) and conversational data files 809 (accessed by CVM 802 via conversation engine APIs 807), each input is converted into a binary or ASCII input, which can be directly processed by the programming language as built-in objects. Calls, flags and tags can be automatically included to transmit between object and processes the conversational meta-information required to correctly interface with the different objects. Moreover, output streams can be specially formatted according to the needs of the application or user. These programming tools allow multi-modal discourse processing to be readily built. Moreover, logic statement status and operators are expanded to handle the richness of conversational queries that can be compared on the bases of their ASCII/binary content or on the basis of their NLU-converted (natural language understanding-converted) query (input/output of conventional and conversational sub-systems) or FSG-based queries (where the system used restricted commands). Logic operators can be implemented to test or modify such systems. Conversational logic values/operators expand to include: true, false, incomplete, ambiguous, different/equivalent for an ASCII point of view, different/equivalent from a NLU point of view, different/equivalent from a active query field point of view, unknown, incompatible, and incomparable.

Furthermore, the conversational application API layer 803 comprises code for providing extensions of the underlying OS features and behavior. Such extensions include, for example, high level of abstraction and abstract categories associated with any object, self-registration mechanisms of abstract categories, memorization, summarization, conversational search, selection, redirection, user customization, train ability, help, multi-user and security capabilities, as well as the foundation class libraries.

The conversational computing system of FIG. 8B further comprises a conversational engine API layer 807 which provides an interface between core engines conversational engines 808 (e.g., speech recognition, speaker recognition, NL parsing, NLU, TTS and speech compression/decompression engines, visual recognition) and the applications using them. The engine API layer 807 also provides the protocols to communicate with core engines whether they be local or remote. An I/O API layer 810 provides an interface with conventional I/O resources 811 such as a keyboard, mouse, touch screen, keypad, etc. (for providing a multi-modal conversational UI), an audio subsystem for capturing speech I/O (audio in/audio out), and a video subsystem for capturing video I/O. The I/O API layer 810 provides device abstractions, I/O abstractions and UI abstractions. The I/O resources 811 will register with the CVM kernel layer 802 via the I/O API layer 810. It is to be understood that the I/O APIs 810 may be implemented as part of the I/O manager 14 of FIG. 1, while the I/O resources 811 may be implemented as part of the I/O subsystem 12 of FIG. 1

The core CVM kernel layer 802 comprises programming layers such as a conversational application and behavior/service manager layer 815, a conversational dialog manager (arbitrator) layer 819, a conversational resource manager layer 820, a task/dispatcher manager 821 and a meta-information manager 822, which provide the core functions of the CVM layer 802. It is to be understood that these components may be implemented as part of the dialog manager 18 of FIG. 1. The conversational application and behavior/service manager layer 815 comprises functions for managing the conventional and conversationally aware applications 800 and 801. Such management functions include, for example, keeping track of which applications are registered (both local and network-distributed), what are the dialog interfaces (if any) of the applications, and what is the state of each application. In addition, the conversational application and services/behavior manager 815 initiates all the tasks associated with any specific service or behavior provided by the CVM system. The conversational services and behaviors are all the behaviors and features of a conversational UI that the user may expect to find in the applications and interactions, as well as the features that an application developer may expect to be able to access via APIs (without having to implement with the development of the application). Examples of the conversational services and behavior provided by the CVM kernel 802 include, but are not limited to, conversational categorization and meta-information, conversational object, resource and file management, conversational search, conversational selection, conversational customization, conversational security, conversational help, conversational prioritization, conversational resource management, output formatting and presentation, summarization, conversational delayed actions/agents/memorization, conversational logic, and coordinated interfaces and devices. Such services are provided through API calls via the conversational application API Layer 803. The conversational application and behavior/services manager 815 is responsible for executing all the different functions needed to adapt the UI to the capabilities and constraints of the device, application and/or user preferences.

The conversational dialog manager 819 comprises functions for managing the dialog (conversational dialog comprising speech and other multi-modal I/O such as GUI keyboard, pointer, mouse, as well as video input, etc.) and arbitration (dialog manager arbitrator or DMA) across all registered applications. In particular, the conversational dialog manager 819 determines what information the user has, which inputs the user presents, and which application(s) should handle the user inputs. The DMA processes abstracted I/O events (abstracted by the I/O manager) using the context/history to understand the user intent. When an abstract event occurs, the DMA determines the target of the event and, if needed, seeks confirmation, disambiguation, correction, more details, etc., until the intent is unambiguous and fully determined. The DMA then launches the action associated to the user's query. The DMA function handles multi-modal I/O events to: (1) determine the target application or dialog (or portion of it); and (2) use past history and context to: (a) understand the intent of the user; (b) follow up with a dialog to disambiguate, complete, correct or confirm the understanding; (c) or, dispatch a task resulting from fall understanding of the intent of the user.

The conversational resource manager 820 determines what conversational engines 808 are registered (either local conversational 808 and/or network-distributed resources), the capabilities of each registered resource, and the state of each registered resource. In addition, the conversational resource manager 820 prioritizes the allocation of CPU cycles or input/output priorities to maintain a flowing dialog with the active application (e.g., the engines engaged for recognizing or processing a current input or output have priorities). Similarly, for distributed applications, it routes and selects the engine and network path to be used to minimize any network delay for the active foreground process.

The task dispatcher/manager 821 dispatches and coordinates different tasks and processes that are spawned (by the user and machine) on local and networked conventional and conversational resources. The meta-information manager 822 manages the meta-information associated with the system via a meta-information repository 818. The meta-information manager 822 and repository 818 collect all the information typically assumed known in a conversational interaction but not available at the level of the current conversation. Examples are a-priori knowledge, cultural, educational assumptions and persistent information, past request, references, information about the user, the application, news, etc. It is typically the information that needs to be preserved and persist beyond the length/life of the conversational history/context and the information that is expected to be common knowledge for the conversation and, therefore, has never been defined during the current and possible past conversational interactions. Also, shortcuts to commands, resources and macros, etc., are managed by the meta-information manager 822 and stored in the meta-information repository 818. In addition, the meta-information repository 818 includes a user-usage log based on user identity. It is to be appreciated that services such as conversational help and assistance, as well as some dialog prompts (introduction, questions, feedback, etc.) provided by the CVM system can be tailored based on the usage history of the user as stored in the meta-information repository 818 and associated with the application. If a user has been previously interacting with a given application, an explanation can be reduced assuming that it is familiar to the user. Similarly, if a user commits many errors, the explanations can be more complex, as multiple errors are interpreted as user uncertainty, unfamiliarity, or incomprehension/misunderstanding of the application or function.

A context stack 817 is managed by the dialog manager 819, possibly through a context manager that interacts with the dialog manager and arbitrator. It is to be understood that the context stack 817 may be implemented as part of the context stack 20 of FIG. 1. The context stack 817 comprises all the information associated with an application. Such information includes all the variable, states, input, output and queries to the backend that are performed in the context of the dialog and any extraneous event that occurs during the dialog. The context stack is associated with the organized/sorted context corresponding to each active dialog (or deferred dialog-agents/memorization). A global history 816 is included in the CVM system and includes information that is stored beyond the context of each application. The global history stores, for example, the information that is associated with all the applications and actions taking during a conversational session (i.e., the history of the dialog between user and machine for a current session or from when the machine was activated).

The CVM kernel layer 802 further comprises a backend abstraction layer 823 which allows access to backend business logic 813 via the dialog manager 819 (rather than bypassing the dialog manager 819). This allows such accesses to be added to the context stack 817 and global history 816. For instance, the backend abstraction layer 823 can translate input and output to and from the dialog manager 819 to database queries. This layer 823 will convert standardized attribute value n-tuples into database queries and translate the result of such queries into tables or sets of attribute value n-tuples back to the dialog manager 819. In addition, a conversational transcoding layer 824 is provided to adapt the behavior, UI and dialog presented to the user based on the I/O and engine capabilities of the device which executes the CVM system.

The CVM system further comprises a communication stack 814 (or communication engines) as part of the underlying system services provided by the OS 812. The CVM system utilizes the communication stack to transmit information via conversational protocols 804 which extend the conventional communication services to provide conversational communication. It is to be understood that the communication stack 814 may be implemented in connection with the well-known OSI (open system interconnection) protocol layers for providing conversational communication exchange between conversational devices. As is known in the art, OSI comprises seven layers with each layer performing a respective function to provide communication between network distributed conversational applications of network-connected devices. Such layers (whose functions are well-understood) comprise an application layer, a presentation layer, a session layer, a transport layer, a network layer, a data link layer and a physical layer. The application layer is extended to allow conversational communication via the conversational protocols 804.

The conversational protocols 804 allow, in general, remote applications and resources register their conversational capabilities and proxies. These conversational protocols 804 are further disclosed in the PCT patent application identified as PCT/US99/22925 filed on Oct. 1, 1999 and entitled "System and Method For Providing Network Coordinated Conversational Services," which is incorporated herein by reference (wherein the conversational protocols are utilized in a system that does not utilize a CVM system).

It is to be appreciated that while a preferred embodiment of the multi-modal conversational computing system 10 of FIG. 1 may implement a CVM-based system as described above in the context of FIGS. 8A and 8B, the multi-modal conversational computing system 10 may alternatively be implemented as a "conversational browser" as described in the above-referenced PCT patent application identified as PCT/US99/23008. Given the teachings provided herein, one of ordinary skill in the art will realize various other ways of implementing the multi-modal conversational computing system of the present invention.

D. Conversational Data Mining

Figure 9A:
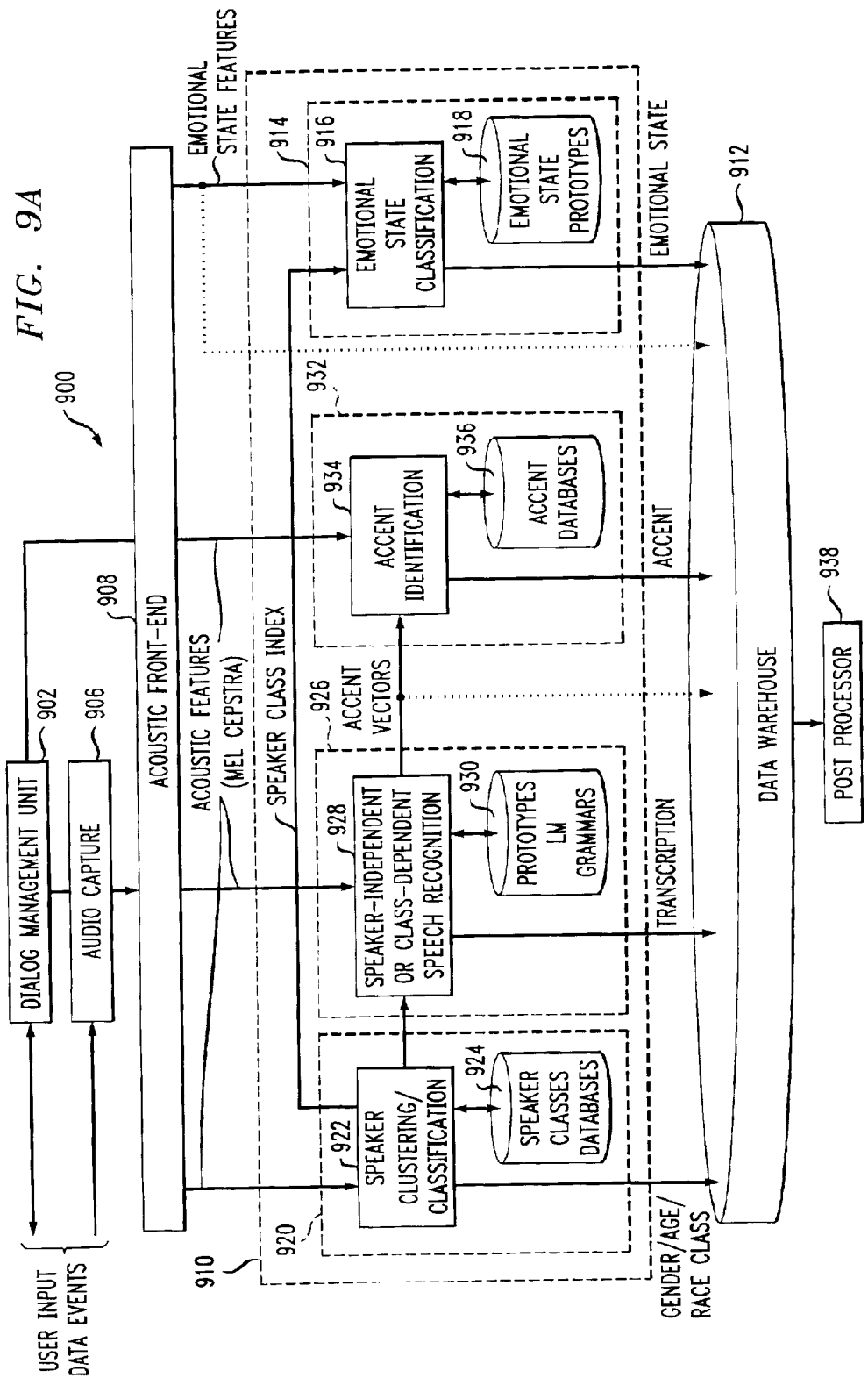
Figure 9B:
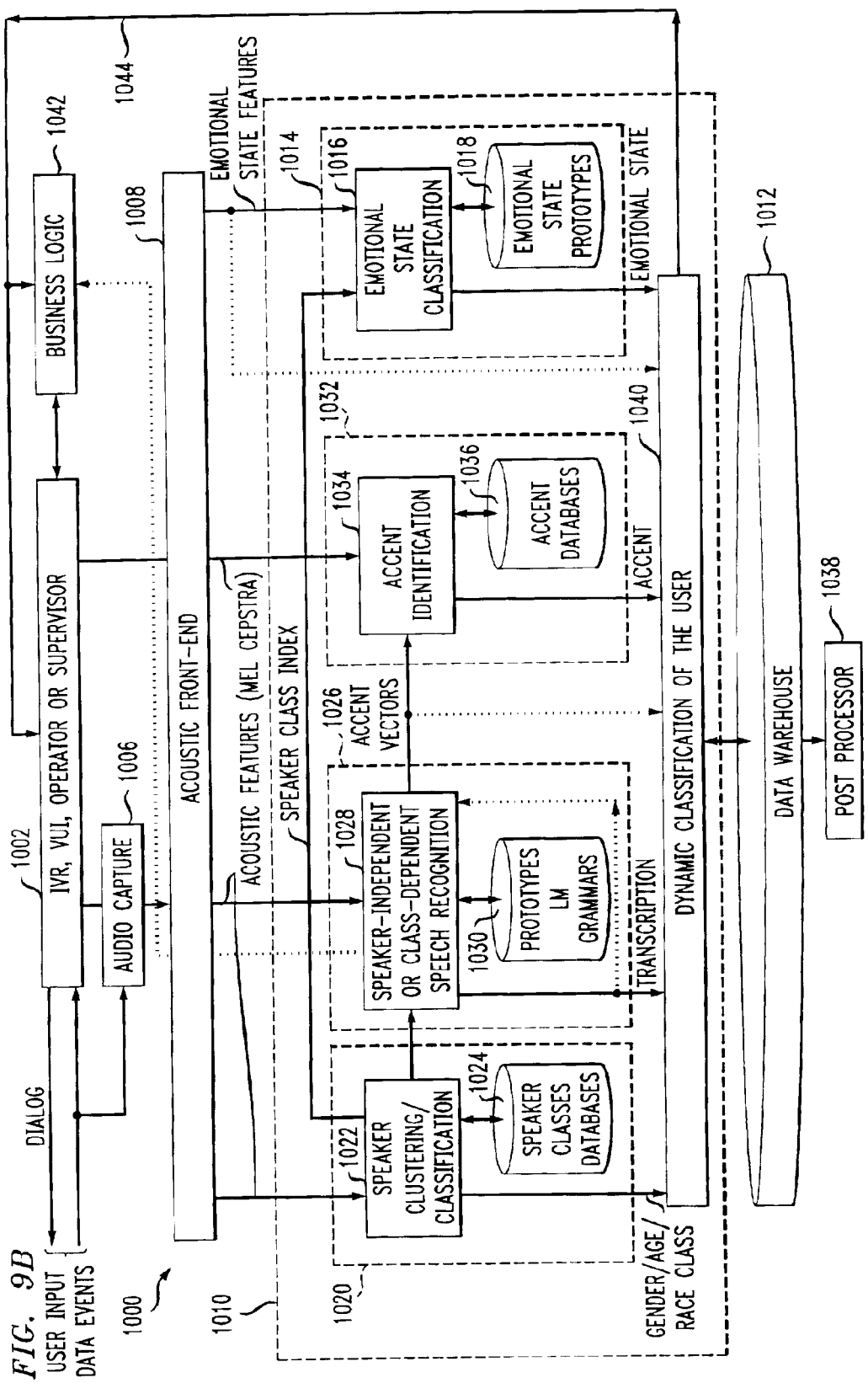

Referring now to FIGS. 9A and 9B, block diagrams illustrate preferred embodiments of respective conversational data mining systems. It is to be appreciated that such conversational data mining systems are disclosed in the above-referenced U.S. patent application identified as Ser. No. 09/371,400 filed on Aug. 10, 1999 and entitled "Conversational Data Mining," incorporated by reference herein. A description of such systems, one of which may be employed to implement a mood/focus classifier module 22 of FIG. 1, is provided below in this section. However, it is to be appreciated that other mechanisms for implementing mood classification and focus detection according to the invention may be employed.

While focus detection may be performed in accordance with the dialog manager 18 (FIG. 1) along with ambiguity resolution, it is preferably performed in accordance with the mood/focus classifier 22 (FIG. 1), an implementation of which will be described below. It is to be appreciated that focus can be determined by classification and data mining exactly the same way as mood is determined or the user is classified (as will be explained below), i.e., the attitude and moves/gestures of the user are used to determine stochastically the most likely focus item and focus state.

FIGS. 9A and 9B will be used to generally describe mood/focus classification techniques that may be employed in the mood/focus classifier 22 (FIG. 1) with respect to speech-based event data. However, the extended application to include the modality associated with video-based event data will be illustrated in the context of FIG. 9C where it is shown that these classification techniques can be easily applied to multi-modal input.

FIG. 9A depicts an apparatus for collecting data associated with a voice of a user, in accordance with the present invention. The apparatus is designated generally as 900. The apparatus includes a dialog management unit 902 which conducts a conversation with the user. It is to be understood that the user-provided input data events are preferably provided to the system 900 via the I/O manager 14 of FIG. 1. Apparatus 900 further includes an audio capture module 906 which is coupled to the dialog management unit 902 and which captures a speech waveform associated with utterances spoken by the user 904 during the conversation. While shown for ease of explanation in FIG. 9A, the audio capture unit 906 may be part of the I/O subsystem 12 of FIG. 1. In which case, the captured input data is passed onto system 900 via the I/O manager 14. As used herein, a conversation should be broadly understood to include any interaction, between a first human and either a second human, a machine, or a combination thereof, which includes at least some speech. Again, based on the above described teachings of the multi-modal system 10 of the invention, the mood classification (focus detection) system 900 may be extended to process video in a similar manner.

Apparatus 900 further includes an acoustic front end 908 which is coupled to the audio capture module 906 and which is configured to receive and digitize the speech waveform so as to provide a digitized speech waveform. Further, acoustic front end 908 is also configured to extract, from the digitized speech waveform, at least one acoustic feature which is correlated with at least one user attribute. The at least one user attribute can include at least one of the following: gender of the user, age of the user, accent of the user, native language of the user, dialect of the user, socioeconomic classification of the user, educational level of the user, and emotional state of the user. The dialog management unit 902 may employ acoustic features, such as MEL cepstra, obtained from acoustic front end 908 and may therefore, if desired, have a direct coupling thereto.

Apparatus 900 further includes a processing module 910 which is coupled to the acoustic front end 908 and which analyzes the at least one acoustic feature to determine the at least one user attribute. Yet further, apparatus 900 includes a data warehouse 912 which is coupled to the processing module 910 and which stores the at least one user attribute, together with at least one identifying indicia, in a form for subsequent data mining thereon. Identifying indicia will be discussed elsewhere herein.

The gender of the user can be determined by classifying the pitch of the user's voice, or by simply clustering the features. In the latter method, voice prints associated with a large set of speakers of a given gender are built and a speaker classification is then performed with the two sets of models. Age of the user can also be determined via classification of age groups, in a manner similar to gender. Although having limited reliability, broad classes of ages, such as children, teenagers, adults and senior citizens can be separated in this fashion.

Determination of accent from acoustic features is known in the art. For example, the paper "A Comparison of Two Unsupervised Approaches to Accent Identification" by Lincoln et al., presented at the 1998 International Conference on Spoken Language Processing, Sidney, Australia [hereinafter ICSLP'98], sets forth useful techniques. Native language of the user can be determined in a manner essentially equivalent to accent classification. Meta information about the native language of the speaker can be added to define each accent/native language model.

That is, at the creation of the models for each native language, one employs a speaker or speakers who are tagged with that language as their native language. The paper "Language Identification Incorporating Lexical Information" by Matrouf et al., also presented at ICSLP'98, discusses various techniques for language identification.

The user's dialect can be determined from the accent and the usage of keywords or idioms which are specific to a given dialect. For example, in the French language, the choice of "nonante" for the numeral 90 instead of "Quatre Vingt Dix" would identify the speaker as being of Belgian or Swiss extraction, and not French or Canadian. Further, the consequent choice of "quatre-vingt" instead of "octante" or "Huitante" for the numeral 80 would identify the individual as Belgian and not Swiss. In American English, the choice of "grocery sack" rather than "grocery bag" might identify a person as being of Midwestern origin rather than Midatlantic origin. Another example of Midwestern versus Midatlantic American English would be the choice of "pop" for a soft drink in the Midwest and the choice of "soda" for the corresponding soft drink in the middle Atlantic region. In an intentional context, the use of "holiday" rather than "vacation" might identify someone as being of British rather than United States origin. The operations described in this paragraph can be carried out using a speech recognizor 126 which will be discussed below.

The socioeconomic classification of the user can include such factors as the racial background of the user, ethnic background of the user, and economic class of the user, for example, blue collar, white collar-middle class or wealthy. Such determinations can be made via annotated accents and dialects at the moment of training, as well as by examining the choice of words of the user. While only moderately reliable, it is believed that these techniques will give sufficient insight into the background of the user so as to be useful for data mining.

The educational level of the user can be determined by the word choice and accent, in a manner similar to the socioeconomic classification; again, only partial reliability is expected, but sufficient for data mining purposes.

Determination of the emotional state of the user from acoustic features is well known in the art. Emotional categories which can be recognized include hot anger, cold anger, panic, fear, anxiety, sadness, elation, despair, happiness, interest, boredom, shame, contempt, confusion, disgust and pride. Exemplary methods of determining emotional state from relevant acoustic features are set forth in the following papers: "Some Acoustic Characteristics of Emotion" by Pereira and Watson, "Towards an Automatic Classification of Emotions in Speech" by Amir and Ron, and "Simulated Emotions: An Acoustic Study of Voice and Perturbation Measures" by Whiteside, all of which were presented at ICSLP'98.

The audio capture module 906 can include, for example, at least one of an analog-to-digital converter board, an interactive voice response system, and a microphone. The dialog management unit 902 can include a telephone interactive voice response system, for example, the same one used to implement the audio capturing. Alternatively, the dialog management unit may simply be an acoustic interface to a human operator. Dialog management unit 902 can include natural language understanding (NLU), natural language generation (NLG), finite state grammar (FSG), and/or text-to-speech syntheses (TTS) for machine-prompting the user in lieu of, or in addition to, the human operator. The processing module 910 can be implemented in the processor portion of the IVR, or can be implemented in a separate general purpose computer with appropriate software. Still further, the processing module can be implemented using an application specific circuit such as an application specific integrated circuit (ASIC) or can be implemented in an application specific circuit employing discrete components, or a combination of discrete and integrated components.

Processing module 910 can include an emotional state classifier 914. Classifier 914 can in turn include an emotional state classification module 916 and an emotional state prototype data base 918.

Processing module 910 can further include a speaker clusterer and classifier 920. Element 920 can further include a speaker clustering and classification module 922 and a speaker class data base 924.

Processing module 910 can further include a speech recognizor 926 which can, in turn, itself include a speech recognition module 928 and a speech prototype, language model and grammar database 930. Speech recognizor 926 can be part of the dialog management unit 902 or, for example, a separate element within the implementation of processing module 910. Yet further, processing module 910 can include an accent identifier 932, which in turn includes an accent identification module 934 and an accent database 936.

Processing module 910 can include any one of elements 914, 920, 926 and 932; all of those elements together; or any combination thereof.

Apparatus 900 can further include a post processor 938 which is coupled to the data warehouse 912 and which is configured to transcribe user utterances and to perform keyword spotting thereon. Although shown as a separate item in FIG. 9A, the post processor can be a part of the processing module 910 or of any of the sub-components thereof. For example, it can be implemented as part of the speech recognizor 926. Post processor 938 can be implemented as part of the processor of an IVR, as an application specific circuit, or on a general purpose computer with suitable software modules. Post processor 938 can employ speech recognizor 926. Post processor 938 can also include a semantic module (not shown) to interpret meaning of phrases. The semantic module could be used by speech recognizor 926 to indicate that some decoding candidates in a list are meaningless and should be discarded/replaced with meaningful candidates.

The acoustic front end 908 can typically be an eight dimensions plus energy front end as known in the art. However, it should be understood that 13, 24, or any other number of dimensions could be used. MEL cepstra can be computed, for example, over 25 ms frames with a 10 ms overlap, along with the delta and delta delta parameters, that is, the first and second finite derivatives. Such acoustic features can be supplied to the speaker clusterer and classifier 920, speech recognizor 926 and accent identifier 932, as shown in FIG. 9A.

Other types of acoustic features can be extracted by the acoustic front end 908. These can be designated as emotional state features, such as running average pitch, running pitch variance, pitch jitter, running energy variance, speech rate, shimmer, fundamental frequency, and variation in fundamental frequency. Pitch jitter refers to the number of sign changes of the first derivative of pitch. Shimmer is energy jitter. These features can be supplied from the acoustic front end 908 to the emotional state classifier 914. The aforementioned acoustic features, including the MEL cepstra and the emotional state features, can be thought of as the raw, that is, unprocessed features.

User queries can be transcribed by an IVR or otherwise. Speech features can first be processed by a text-independent speaker classification system, for example, in speaker clusterer and classifier 920. This permits classification of the speakers based on acoustic similarities of their voices. Implementation and use of such a system is disclosed in U.S. patent application Ser. No. 60/011,058, filed Feb. 2, 1996; U.S. patent application Ser. No. 08/787,031, filed Jan. 28, 1997 (now U.S. Pat. No. 5,895,447 issued Apr. 20, 1999); U.S. patent application Ser. No. 08/788,471, filed Jan. 28, 1997; and U.S. patent application Ser. No. 08/787,029, filed Jan. 28, 1997, all of which are co-assigned to International Business Machines Corporation, and the disclosure of all of which is expressly incorporated herein by reference for all purposes. The classification of the speakers can be supervised or unsupervised. In the supervised case, the classes have been decided beforehand based on external information. Typically, such classification can separate between male and female, adult versus child, native speakers versus different classes of non-native speakers, and the like. The indices of this classification process constitute processed features. The results of this process can be supplied to the emotional state classifier 914 and can be used to normalize the emotional state features with respect to the average (mean) observed for a given class, during training, for a neutral emotional state. The normalized emotional state features are used by the emotional state classifier 914 which then outputs an estimate of the emotional state. This output is also considered to be part of the processed features. To summarize, the emotional state features can be normalized by the emotional state classifier 914 with respect to each class produced by the speech clusterer and classifier 920. A feature can be normalized as follows. Let $X_0$ be the normal frequency. Let $X_1$ be the measured frequency. Then, the normalized feature will be given by $X_1$ minus $X_0$. This quantity can be positive or 5 negative, and is not, in general, dimensionless.

The speech recognizor 926 can transcribe the queries from the user. It can be a speaker-independent or class-dependent large vocabulary continuous speech recognition, or system could be something as simple as a keyword spotter to detect insults (for example) and the like. Such systems are well known in the art. The output can be full sentences, but finer granularity can also be attained; for example, time alignment of the recognized words. The time stamped transcriptions can also be considered as part of the processed features, and will be discussed further below with respect to methods in accordance with the present invention. Thus, conversation from every stage of a transaction can be transcribed and stored. As shown in FIG. 9A, appropriate data is transferred from the speaker clusterer and classifier 920 to the emotional state classifier 914 and the speech recognizor 926. As noted, it is possible to perform accent, dialect and language recognition with the input speech from the user. A continuous speech recognizor can be trained on speech with several speakers having the different accents which are to be recognized. Each of the training speakers is also associated with an accent vector, with each dimension representing the most likely mixture component associated with each state of each lefeme. The speakers can be clustered based on the distance between these accent vectors, and the clusters can be identified by, for example, the accent of the member speakers. The accent identification can be performed by extracting an accent vector from the user's speech and classifying it. As noted, dialect, socioeconomic classification, and the like can be estimated based on vocabulary and word series used by the user. Appropriate key words, sentences, or grammatical mistakes to detect can be compiled via expert linguistic knowledge. The accent, socioeconomic background, gender, age and the like are part of the processed features. As shown in FIG. 9A, any of the processed features, indicated by the solid arrows, can be stored in the data warehouse 912. Further, raw features, indicated by the dotted lines can also be stored in the data warehouse 912.

Any of the processed or raw features can be stored in the data warehouse 912 and then associated with the other data which has been collected, upon completion of the transaction. Classical data mining techniques can then be applied. Such techniques are known, for example, as set forth in the book "Data Warehousing, Data Mining and OAAP," by Alex Berson and Stephen J. Smith, published by McGraw Hill in 1997, and in "Discovering Data Mining," by Cabena et al., published by Prentice Hall in 1998. For a given business objective, for example, target marketing, predictive models or classifiers are automatically obtained by applying appropriate mining recipes. All data stored in the data warehouse 912 can be stored in a format to facilitate subsequent data mining thereon. Those of skill in the art are aware of appropriate formats for data which is to be mined, as set forth in the two cited reference books. Business objectives can include, for example, detection of users who are vulnerable to a proposal to buy a given product or service, detection of users who have problems with the automated system and should be transferred to an operator and detection of users who are angry at the service and should be transferred to a supervisory person. The user can be a customer of a business which employs the apparatus 900, or can be a client of some other type of institution, such as a nonprofit institution, a government agency or the like.

Features can be extracted and decisions dynamically returned by the models. This will be discussed further below.

FIG. 9B depicts a real-time-modifiable voice system for interaction with a user, in accordance with the present invention, which is designated generally as 1000. Elements in FIG. 9B which are similar to those in FIG. 9A have received the same reference numerals incremented by 100. System 1000 can include a dialog management unit 1002 similar to that discussed above. In particular, as suggested in FIG. 9B, unit 1002 can be a human operator or supervisor, an IVR, or a Voice User Interface (VUI). System 1000 can also include an audio capture module 1006 similar to that described above, and an acoustic front end 1008, also similar to that described above. Just as with apparatus 900, unit 1002 can be directly coupled to acoustic front end 1008, if desired, to permit use of MEL cepstra or other acoustic features determined by front end 1008. Further, system 1000 includes a processing module 1010 similar to that described above, but having certain additional features which will now be discussed. Processing module 1010 can include a dynamic classification module 1040 which performs dynamic classification of the user. Accordingly, processing module 1010 is configured to modify behavior of the voice system 1000 based on at least one user attribute which has been determined based on at least one acoustic feature extracted from the user's speech. System 1000 can further include a business logic unit 1042 which is coupled to the dialog management unit 1002, the dynamic classification module 1040, and optionally to the acoustic front end 1008. The business logic unit can be implemented as a processing portion of the IVR or VUI, can be part of an appropriately programmed general purpose computer, or can be an application specific circuit. At present, it is believed preferable that the processing module 1010 (including module 1040) be implemented as a general purpose computer and that the business logic 1042 be implemented in a processor portion of an interactive voice response system. Dynamic classification module 1040 can be configured to provide feedback which can be real-time feedback to the business logic unit 1042 and the dialog management unit 1002.

A data warehouse 1012 and post processor 1038 can be optionally provided as shown and can operate as discussed above with respect to the data collecting apparatus 900. It should be emphasized, however, that in the real-time-modifiable voice system 1000 of the present invention, data warehousing is optional and if desired, the system can be limited to the real time feedback discussed with respect to elements 1040, 1042 and 1002.

Processing module 1010 can modify behavior of the system 1000, at least in part, by prompting a human operator thereof, as suggested by the feedback line connected with dialog management unit 1002. For example, a human operator could be alerted when an angry emotional state of the user is detected and could be prompted to utter soothing words to the user, or transfer the user to a higher level human supervisor. Further, the processing module 1010 could modify business logic 1042 of the system 1000. This could be done, for example, when both the processing module 1010 and business logic unit 1042 were part of an IVR system. Examples of modification of business logic will be discussed further below, but could include tailoring a marketing offer to the user based on attributes of the user detected by the system 1000.

Referring now to FIG. 9C, a block diagram illustrates how the mood/focus classification techniques described above may be implemented by a mood/focus classifier 2 (FIG. 1) in a multi-modal environment which includes speech and video input event data. As shown, the classifier shown in FIG. 9C comprises a speech input channel 1050-1, a speech channel controller 1052-1, and a speech-based mood classification subsystem 1054-1. The classifier also comprises a video input channel 1050-N, a video channel controller 1052-N, and a video-based mood classification subsystem 1054-N. Of course, other input channels and corresponding classification subsystems may be included to extend the classifier to other modalities. The individual classification subsystems each take raw features from their respective input channel and employ recognition and classification engines to process the features and then, in conjunction with data warehouse 1058, make a dynamic classification determination. The details of these processes are described above with respect to FIGS. 9A and 9B. Video features may be treated similar to speech features. Then, joint dynamic classification may be performed in block 1056 using the data from each input modality to make an overall classification determination. Business logic unit 1060 and multi-modal shell 1062 are used to control the process in accordance with the particular application(s) being run by the mood/focus classifier. Channel controllers 1052-1 and 1052-N are used to control the input of speech data and video data, respectively.

Accordingly, it is to be understood that, after determining the mood of a user, a mood classification system as described above can instruct the I/O subsystem 12 of FIG. 1, via the I/O manager 14, to adjust devices in the environment that would have the effect of changing the user's mood and/or focus, e.g., temperature control system, music system, etc.

Figure 10:
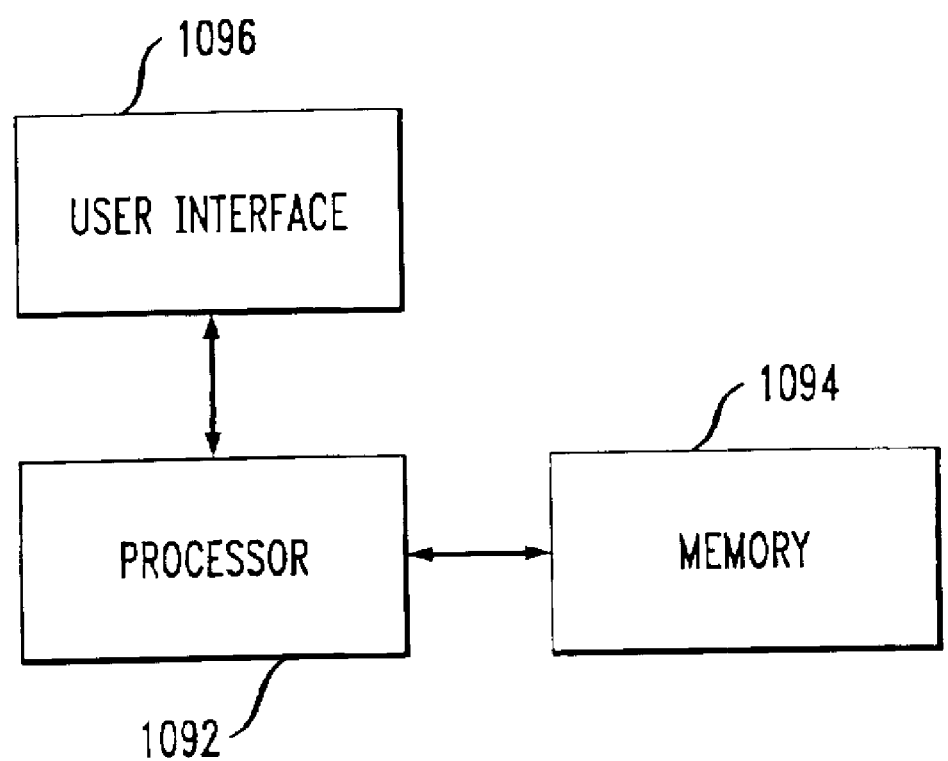
FIG. 10 is a block diagram of an illustrative hardware implementation of a multi-modal conversational computing system according to the invention.

Referring now to FIG. 10, a block diagram of an illustrative hardware implementation of a multi-modal conversational computing system according to the invention is shown. In this particular implementation, a processor 1092 for controlling and performing the various operations associated with the illustrative systems of the invention depicted in FIGS. 1 through 9C is coupled to a memory 1094 and a user interface 1096. It is to be appreciated that the term "processor" as used herein is intended to include any processing device, such as, for example, one that includes a CPU (central processing unit) and/or other processing circuitry. For example, the processor may be a digital signal processor, as is known in the art. Also the term "processor" may refer to more than one individual processor. The term "memory" as used herein is intended to include memory associated with a processor or CPU, such as, for example, RAM, ROM, a fixed memory device (e.g., hard drive), a removable memory device (e.g., diskette), a flash memory, etc. In addition, the term "user interface" as used herein is intended to include, for example, one or more input devices, e.g., keyboard, for inputting data to the processing unit, and/or one or more output devices, e.g., CRT display and/or printer, for providing results associated with the processing unit. The user interface 1096 is also intended to include the one or more microphones for receiving user speech and the one or more cameras/sensors for capturing image data, as well as any other I/O interface devices used in the multi-modal system.

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. In any case, it should be understood that the elements illustrated in FIGS. 1 through 9C may be implemented in various forms of hardware, software, or combinations thereof, e.g., one or more digital signal processors with associated memory, application specific integrated circuit(s), functional circuitry, one or more appropriately programmed general purpose digital computers with associated memory, etc. Given the teachings of the invention provided herein, one of ordinary skill in the related art will be able to contemplate other implementations of the elements of the invention.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A multi-modal conversational computing system, the system comprising:

a user interface subsystem, the user interface subsystem being configured to input multi-modal data from an environment in which the user interface subsystem is deployed, the multi-modal data including data associated with a first modality input sensor and data associated with at least a second modality input sensor, and the environment including one or more users and one or more devices which are controllable by the multi-modal system;

at least one processor, the at least one processor being operatively coupled to the user interface subsystem and being configured to: (i) receive at least a portion of the multi-modal input data from the user interface subsystem; (ii) be capable of making a determination of an intent, a focus and a mood of at least one of the one or more users based on at least a portion of the received multi-modal input data; and (iii) cause execution of one or more actions to occur in the environment based on at least one of the determined intent, the determined focus and the determined mood; and memory, operatively coupled to the at least one processor, which stores at least a portion of results associated with the intent, focus and mood determinations made by the processor for possible use in a subsequent determination;

wherein the intent determination comprises resolving referential ambiguity associated with the one or more user and the one or more device in the environment based on at least a portion of the received multi-modal data.

2. A multi-modal conversational computing system, the system comprising:

a user interface subsystem, the user interface subsystem being configured to input multi-modal data from an environment in which the user interface subsystem is deployed, the multi-modal data including data associated with a first modality input sensor and data associated with at least a second modality input sensor, and the environment including one or more users and one or more devices which are controllable by the multi-modal system;

at least one processor, the at least one processor being operatively coupled to the user interface subsystem and being configured to: (i) receive at least a portion of the multi-modal input data from the user interface subsystem; (ii) make a determination of at least one of an intent, a focus and a mood of at least one of the one or more users based on at least a portion of the received multi-modal input data; and (iii) cause execution of one or more actions to occur in the environment based on at least one of the determined intent, the determined focus and the determined mood; and memory, operatively coupled to the at least one processor, which stores at least a portion of results associated with the intent, focus and mood determinations made by the processor for possible use in a subsequent determination;

wherein the intent determination comprises resolving referential ambiguity associated with the one or more users and the one or more devices in the environment based on at least a portion of the received multi-modal data;

wherein the execution of one or more actions in the environment comprises controlling at least one of the one or more devices in the environment to at least one of effectuate the determined intent, effect the determined focus, and effect the determined mood of the one or more users.

3. A multi-modal conversational computing system, the system comprising:

a user interface subsystem, the user interface subsystem being configured to input multi-modal data from an environment in which the user interface subsystem is deployed, the multi-modal data including data associated with a first modality input sensor and data associated with at least a second modality input sensor, and the environment including one or more users and one or more devices which are controllable by the multi-modal system;

at least one processor, the at least one processor being operatively coupled to the user interface subsystem and being configured to: (i) receive at least a portion of the multi-modal input data from the user interface subsystem; (ii) make a determination of at least one of an intent, a focus and a mood of at least one of the one or more users based on at least a portion of the received multi-modal input data; and (iii) cause execution of one or more actions to occur in the environment based on at least one of the determined intent, the determined focus and the determined mood; and memory, operatively coupled to the at least one processor, which stores at least a portion of results associated with the intent, focus and mood determinations made by the processor for possible use in a subsequent determination;

wherein the intent determination comprises resolving referential ambiguity associated with the one or more user and the one or more device in the environment based on at least a portion of the received multi-modal data;

wherein the execution of one or more actions in the environment comprises controlling at least one of the one or more devices in the environment to request further user input to assist in making at least one of the determinations.

4. A multi-modal conversational computing system, the system comprising:

a user interface subsystem, the user interface subsystem being configured to input multi-modal data from an environment in which the user interface subsystem is deployed, the multi-modal data including data associated with a first modality input sensor and data associated with at least a second modality input sensor, and the environment including one or more users and one or more devices which are controllable by the multi-modal system;

at least one processor, the at least one processor being operatively coupled to the user interface subsystem and being configured to: (i) receive at least a portion of the multi-modal input data from the user interface subsystem; (ii) make a determination of at least one of an intent, a focus and a mood of at least one of the one or more users based on at least a portion of the received multi-modal input data; and (iii) cause execution of one or more actions to occur in the environment based on at least one of the determined intent, the determined focus and the determined mood; and memory, operatively coupled to the at least one processor, which stores at least a portion of results associated with the intent, focus and mood determinations made by the processor for possible use in a subsequent determination;

wherein the intent determination comprises resolving referential ambiguity associated with the one or more users and the one or more devices in the environment based on at least a portion of the received multi-modal data;

wherein the execution of the one or more actions comprises initiating a process to at least one of further complete, correct, and disambiguate what the system understands from previous input.

5. A multi-modal conversational computing system, the system comprising:

a user interface subsystem, the user interface subsystem being configured to input multi-modal data from an environment in which the user interface subsystem is deployed, the multi-modal data including data associated with a first modality input sensor and data associated with at least a second modality input sensor, and the environment including one or more users and one or more devices which are controllable by the multi-modal system;

at least one processor, the at least one processor being operatively coupled to the user interface subsystem and being configured to: (i) receive at least a portion of the multi-modal input data from the user interface subsystem; (ii) make a determination of at least one of an intent, a focus and a mood of at least one of the one or more users based on at least a portion of the received multi-modal input data; and (iii) cause execution of one or more actions to occur in the environment based on at least one of the determined intent, the determined focus and the determined mood; and memory, operatively coupled to the at least one processor, which stores at least a portion of results associated with the intent, focus and mood determinations made by the processor for possible use in a subsequent determination;

wherein the intent determination comprises resolving referential ambiguity associated with the one or more users and the one or more devices in the environment based on at least a portion of the received multi-modal data;

wherein the at least one processor is further configured to abstract the received multi-modal input data into one or more events prior to making the one or more determinations.

6. A multi-modal conversational computing system, the system comprising:

a user interface subsystem, the user interface subsystem being configured to input multi-modal data from an environment in which the user interface subsystem is deployed, the multi-modal data including data associated with a first modality input sensor and data associated with at least a second modality input sensor, and the environment including one or more users and one or more devices which are controllable by the multi-modal system;

at least one processor, the at least one processor being operatively coupled to the user interface subsystem and being configured to: (i) receive at least a portion of the multi-modal input data from the user interface subsystem; (ii) make a determination of at least one of an intent, a focus and a mood of at least one of the one or more users based on at least a portion of the received multi-modal input data; and (iii) cause execution of one or more actions to occur in the environment based on at least one of the determined intent, the determined focus and the determined mood; and memory, operatively coupled to the at least one processor, which stores at least a portion of results associated with the intent, focus and mood determinations made by the processor for possible use in a subsequent determination;

wherein the intent determination comprises resolving referential ambiguity associated with the one or more users and the one or more devices in the environment based on at least a portion of the received multi-modal data;

wherein the at least one processor is further configured to perform one or more recognition operations on the received multi-modal input data prior to making the one or more determinations.

7. A multi-modal conversational computing system, the system comprising:

a user interface subsystem, the user interface subsystem being configured to input multi-modal data from an environment in which the user interface subsystem is deployed, the multi-modal data including data associated with a first modality input sensor and data associated with at least a second modality input sensor, and the environment including one or more users and one or more devices which are controllable by the multi-modal system;

an input/output manager module operatively coupled to the user interface subsystem and configured to abstract the multi-modal input data into one or more events;

one or more recognition engines operatively coupled to the input/output manager module and configured to perform, when necessary, one or more recognition operations on the abstracted multi-modal input data;

a dialog manager module operatively coupled to the one or more recognition engines and the input/output manager module and configured to: (i) receive at least a portion of the abstracted multi-modal input data and, when necessary, the recognized multi-modal input data; (ii) make a determination of an intent of at least one of the one or more users based on at least a portion of the received multi-modal input data; and (iii) cause execution of one or more actions to occur in the environment based on the determined intent;

a focus and mood classification module operatively coupled to the one or more recognition engines and the input/output manager module and configured to: (i) receive at least a portion of the abstracted multi-modal input data and, when necessary, the recognized multi-modal input data; (ii) make a determination of at least one of a focus and a mood of at least one of the one or more users based on at least a portion of the received multi-modal input data; and (iii) cause execution of one or more actions to occur in the environment based on at least one of the determined focus and mood; and a context stack memory operatively coupled to the dialog manager module, the one or more recognition engines and the focus and mood classification module, which stores at least a portion of results associated with the intent, focus and mood determinations made by the dialog manager and the classification module for possible use in a subsequent determination;

wherein the intent determination comprises resolving referential ambiguity associated with the one or more users and the one or more devices in the environment based on at least a portion of the received multi-modal data.

8. A computer-based conversational computing method, the method comprising the steps of:

obtaining multi-modal data from an environment including one or more users and one or more controllable devices, the multi-modal data including data associated with a first modality input sensor and data associated with at least a second modality input sensor;

providing for a capability to make a determination of an intent, a focus and a mood of at least one of the one or more users based on at least a portion of the obtained multi-modal input data;

causing execution of one or more actions to occur in the environment based on at least one of the determined intent, the determined focus and the determined mood; and storing at least a portion of results associated with the intent, focus and mood determinations for possible use in a subsequent determination;

wherein the intent determination comprises resolving referential ambiguity associated with the one or more users and the one or more devices in the environment based on at least a portion of the received multi-modal data.

9. A computer-based conversational computing method, the method comprising the steps of:

obtaining multi-modal data from an environment including one or more users and one or more controllable devices, the multi-modal data including data associated with a first modality input sensor and data associated with at least a second modality input sensor;

making a determination of at least one of an intent, a focus and a mood of at least one of the one or more users based on at least a portion of the obtained multi-modal input data;

causing execution of one or more actions to occur in the environment based on at least one of the determined intent, the determined focus and the determined mood; and storing at least a portion of results associated with the intent, focus and mood determinations for possible use in a subsequent determination;

wherein the intent determination comprises resolving referential ambiguity associated with the one or more users and the one or more devices in the environment based on at least a portion of the received multi-modal data;

wherein the step of causing the execution of one or more actions in the environment comprises controlling at least one of the one or more devices in the environment to at least one of effectuate the determined intent, effect the determined focus, and effect the determined mood of the one or more users.

10. A computer-based conversational computing method, the method comprising the steps of:

obtaining multi-modal data from an environment including one or more users and one or more controllable devices, the multi-modal data including data associated with a first modality input sensor and data associated with at least a second modality input sensor;

making a determination of at least one of an intent, a focus and a mood of at least one of the one or more users based on at least a portion of the obtained multi-modal input data;

causing execution of one or more actions to occur in the environment based on at least one of the determined intent, the determined focus and the determined mood; and storing at least a portion of results associated with the intent, focus and mood determinations for possible use in a subsequent determination;

wherein the intent determination comprises resolving referential ambiguity associated with the one or more users and the one or more devices in the environment based on at least a portion of the received multi-modal data;

wherein the step of causing the execution of one or more actions in the environment comprises controlling at least one of the one or more devices in the environment to request further user input to assist in making at least one of the determinations.

11. A computer-based conversational computing method, the method comprising the steps of:

obtaining multi-modal data from an environment including one or more users and one or more controllable devices, the multi-modal data including data associated with a first modality input sensor and data associated with at least a second modality input sensor;

making a determination of at least one of an intent, a focus and a mood of at least one of the one or more users based on at least a portion of the obtained multi-modal input data;

causing execution of one or more actions to occur in the environment based on at least one of the determined intent, the determined focus and the determined mood; and storing at least a portion of results associated with the intent, focus and mood determinations for possible use in a subsequent determination;

wherein the intent determination comprises resolving referential ambiguity associated with the one or more users and the one or more devices in the environment based on at least a portion of the received multi-modal data;

wherein the step of causing the execution of the one or more actions comprises initiating a process to at least one of further complete, correct, and disambiguate what the system understands from previous input.

12. A computer-based conversational computing method, the method comprising the steps of:

obtaining multi-modal data from an environment including one or more users and one or more controllable devices, the multi-modal data including data associated with a first modality input sensor and data associated with at least a second modality input sensor;

making a determination of at least one of an intent, a focus and a mood of at least one of the one or more users based on at least a portion of the obtained multi-modal input data;

causing execution of one or more actions to occur in the environment based on at least one of the determined intent, the determined focus and the determined mood; and storing at least a portion of results associated with the intent, focus and mood determinations for possible use in a subsequent determination;

wherein the intent determination comprises resolving referential ambiguity associated with the one or more users and the one or more devices in the environment based on at least a portion of the received multi-modal data;

wherein further comprising the step of abstracting the received multi-modal input data into one or more events prior to making the one or more determinations.

13. A computer-based conversational computing method, the method comprising the steps of:

obtaining multi-modal data from an environment including one or more users and one or more controllable devices, the multi-modal data including data associated with a first modality input sensor and data associated with at least a second modality input sensor;

making a determination of at least one of an intent, a focus and a mood of at least one of the one or more users based on at least a portion of the obtained multi-modal input data;

causing execution of one or more actions to occur in the environment based on at least one of the determined intent, the determined focus and the determined mood;

storing at least a portion of results associated with the intent, focus and mood determinations for possible use in a subsequent determination; and performing one or more recognition operations on the received multi-modal input data prior to making the one or more determinations wherein the intent determination comprises resolving referential ambiguity associated with the one or more users and the one or more devices in the environment based on at least a portion of the received multi-modal data.

14. An article of manufacture for performing conversational computing, comprising a machine readable medium containing one or more programs which when executed implement the steps of:

obtaining multi-modal data from an environment including one or more users and one or more controllable devices, the multi-modal data including data associated with a first modality input sensor and data associated with at least a second modality input sensor;

providing for a capability to make a determination of an intent, a focus and a mood of at least one of the one or more users based on at least a portion of the obtained multi-modal input data;

causing execution of one or more actions to occur in the environment based on at least one of the determined intent, the determined focus and the determined mood; and storing at least a portion of results associated with the intent, focus and mood determinations for possible use in a subsequent determination wherein the intent determination comprises resolving referential ambiguity associated with the one or more users and the one or more devices in the environment based on at least a portion of the received multi-modal data.

15. A multi-modal conversational computing system, the system comprising:

a user interface subsystem, the user interface subsystem being configured to input multi-modal data from an environment in which the user interface subsystem is deployed, the multi-modal data including at least audio-based data and image-based data, and the environment including one or more users and one or more devices which are controllable by the multi-modal system;

at least one processor, the at least one processor being operatively coupled to the user interface subsystem and being configured to: (i) receive at least a portion of the multi-modal input data from the user interface subsystem; (ii) be capable of making a determination of an intent, a focus and a mood of at least one of the one or more users based on at least a portion of the received multi-modal input data; and (iii) cause execution of one or more actions to occur in the environment based on at least one of the determined intent, the determined focus and the determined mood; and memory, operatively coupled to the at least one processor, which stores at least a portion of results associated with the intent, focus and mood determinations made by the processor for possible use in a subsequent determination;

wherein the intent determination comprises resolving referential ambiguity associated with the one or more users and the one or more devices in the environment based on at least a portion of the received multi-modal data.

16. The system of claim 15, wherein the user interface subsystem comprises one or more image capturing devices, deployed in the environment, for capturing the image-based data.

17. The system of claim 16, wherein the image-based data is at least one of in the visible wavelength spectrum and not in the visible wavelength spectrum.

18. The system of claim 16, wherein the image-based data is at least one of video, infrared, and radio frequency-based image data.

19. The system of claim 15, wherein the user interface subsystem comprises one or more audio capturing devices, deployed in the environment, for capturing the audio-based data.

20. The system of claim 19, wherein the one or more audio capturing devices comprise one or more microphones.

21. The system of claim 15, wherein the user interface subsystem comprises one or more graphical user interface-based input devices, deployed in the environment, for capturing graphical user interface-based data.

22. The system of claim 15, wherein the user interface subsystem comprises a stylus-based input device, deployed in the environment, for capturing handwritten-based data.

23. A multi-modal conversational computing system, the system comprising:

a user interface subsystem, the user interface subsystem being configured to input multi-modal data from an environment in which the user interface subsystem is deployed, the multi-modal data including at least audio-based data and image-based data, and the environment including one or more users and one or more devices which are controllable by the multi-modal system;

at least one processor, the at least one processor being operatively coupled to the user interface subsystem and being configured to: (i) receive at least a portion of the multi-modal input data from the user interface subsystem; (ii) make a determination of at least one of an intent, a focus and a mood of at least one of the one or more users based on at least a portion of the received multi-modal input data; and (iii) cause execution of one or more actions to occur in the environment based on at least one of the determined intent, the determined focus and the determined mood; and memory, operatively coupled to the at least one processor, which stores at least a portion of results associated with the intent, focus and mood determinations made by the processor for possible use in a subsequent determination;

wherein the intent determination comprises resolving referential ambiguity associated with the one or more users and the one or more devices in the environment based on at least a portion of the received multi-modal data;

wherein the execution of one or more actions in the environment comprises controlling at least one of the one or more devices in the environment to at least one of effectuate the determined intent, effect the determined focus, and effect the determined mood of the one or more users.

24. A multi-modal conversational computing system, the system comprising:

a user interface subsystem, the user interface subsystem being configured to input multi-modal data from an environment in which the user interface subsystem is deployed, the multi-modal data including at least audio-based data and image-based data, and the environment including one or more users and one or more devices which are controllable by the multi-modal system;

at least one processor, the at least one processor being operatively coupled to the user interface subsystem and being configured to: (i) receive at least a portion of the multi-modal input data from the user interface subsystem; (ii) make a determination of at least one of an intent, a focus and a mood of at least one of the one or more users based on at least a portion of the received multi-modal input data; and (iii) cause execution of one or more actions to occur in the environment based on at least one of the determined intent, the determined focus and the determined mood; and memory, operatively coupled to the at least one processor, which stores at least a portion of results associated with the intent, focus and mood determinations made by the processor for possible use in a subsequent determination;

wherein the intent determination comprises resolving referential ambiguity associated with the one or more users and the one or more devices in the environment based on at least a portion of the received multi-modal data;

wherein the execution of one or more actions in the environment comprises controlling at least one of the one or more devices in the environment to request further user input to assist in making at least one of the determinations.

25. A multi-modal conversational computing system, the system comprising:

a user interface subsystem, the user interface subsystem being configured to input multi-modal data from an environment in which the user interface subsystem is deployed, the multi-modal data including at least audio-based data and image-based data, and the environment including one or more users and one or more devices which are controllable by the multi-modal system;

at least one processor, the at least one processor being operatively coupled to the user interface subsystem and being configured to: (i) receive at least a portion of the multi-modal input data from the user interface subsystem; (ii) make a determination of at least one of an intent, a focus and a mood of at least one of the one or more users based on at least a portion of the received multi-modal input data; and (iii) cause execution of one or more actions to occur in the environment based on at least one of the determined intent, the determined focus and the determined mood; and memory, operatively coupled to the at least one processor, which stores at least a portion of results associated with the intent, focus and mood determinations made by the processor for possible use in a subsequent determination;

wherein the intent determination comprises resolving referential ambiguity associated with the one or more users and the one or more devices in the environment based on at least a portion of the received multi-modal data;

wherein the at least one processor is further configured to abstract the received multi-modal input data into one or more events prior to making the one or more determinations.

26. A multi-modal conversational computing system, the system comprising:

a user interface subsystem, the user interface subsystem being configured to input multi-modal data from an environment in which the user interface subsystem is deployed, the multi-modal data including at least audio-based data and image-based data, and the environment including one or more users and one or more devices which are controllable by the multi-modal system;

at least one processor, the at least one processor being operatively coupled to the user interface subsystem and being configured to: (i) receive at least a portion of the multi-modal input data from the user interface subsystem; (ii) make a determination of at least one of an intent, a focus and a mood of at least one of the one or more users based on at least a portion of the received multi-modal input data; and (iii) cause execution of one or more actions to occur in the environment based on at least one of the determined intent, the determined focus and the determined mood; and memory, operatively coupled to the at least one processor, which stores at least a portion of results associated with the intent, focus and mood determinations made by the processor for possible use in a subsequent determination;

wherein the intent determination comprises resolving referential ambiguity associated with the one or more users and the one or more devices in the environment based on at least a portion of the received multi-modal data;

wherein the at least one processor is further configured to perform one or more recognition operations on the received multi-modal input data prior to making the one or more determinations.

27. The system of claim 26, wherein one of the one or more recognition operations comprises speech recognition.

28. The system of claim 26, wherein one of the one or more recognition operations comprises speaker recognition.

29. The system of claim 26, wherein one of the one or more recognition operations comprises gesture recognition.

30. A multi-modal conversational computing system, the system comprising:

a user interface subsystem, the user interface subsystem being configured to input multi-modal data from an environment in which the user interface subsystem is deployed, the multi-modal data including at least audio-based data and image-based data, and the environment including one or more users and one or more devices which are controllable by the multi-modal system;

at least one processor, the at least one processor being operatively coupled to the user interface subsystem and being configured to: (i) receive at least a portion of the multi-modal input data from the user interface subsystem; (ii) make a determination of at least one of an intent, a focus and a mood of at least one of the one or more users based on at least a portion of the received multi-modal input data; and (iii) cause execution of one or more actions to occur in the environment based on at least one of the determined intent, the determined focus and the determined mood; and memory, operatively coupled to the at least one processor, which stores at least a portion of results associated with the intent, focus and mood determinations made by the processor for possible use in a subsequent determination;

wherein the intent determination comprises resolving referential ambiguity associated with the one or more users and the one or more devices in the environment based on at least a portion of the received multi-modal data;

wherein the execution of the one or more actions comprises initiating a process to at least one of further complete, correct, and disambiguate what the system understands from previous input.

31. A multi-modal conversational computing system, the system comprising:

a user interface subsystem, the user interface subsystem being configured to input multi-modal data from an environment in which the user interface subsystem is deployed, the multi-modal data including at least audio-based data and image-based data, and the environment including one or more users and one or more devices which are controllable by the multi-modal system;

an input/output manager module operatively coupled to the user interface subsystem and configured to abstract the multi-modal input data into one or more events;

one or more recognition engines operatively coupled to the input/output manager module and configured to perform, when necessary, one or more recognition operations on the abstracted multi-modal input data;

a dialog manager module operatively coupled to the one or more recognition engines and the input/output manager module and configured to: (i) receive at least a portion of the abstracted multi-modal input data and, when necessary, the recognized multi-modal input data; (ii) make a determination of an intent of at least one of the one or more users based on at least a portion of the received multi-modal input data; and (iii) cause execution of one or more actions to occur in the environment based on the determined intent;

a focus and mood classification module operatively coupled to the one or more recognition engines and the input/output manager module and configured to: (i) receive at least a portion of the abstracted multi-modal input data and, when necessary, the recognized multi-modal input data; (ii) make a determination of at least one of a focus and a mood of at least one of the one or more users based on at least a portion of the received multi-modal input data; and (iii) cause execution of one or more actions to occur in the environment based on at least one of the determined focus and mood; and a context stack memory operatively coupled to the dialog manager module, the one or more recognition engines and the focus and mood classification module, which stores at least a portion of results associated with the intent, focus and mood determinations made by the dialog manager and the classification module for possible use in a subsequent determination;

wherein the intent determination comprises resolving referential ambiguity associated with the one or more users and the one or more devices in the environment based on at least a portion of the received multi-modal data.

32. A computer-based conversational computing method, the method comprising the steps of:

obtaining multi-modal data from an environment including one or more users and one or more controllable devices, the multi-modal data including at least audio-based data and image-based data;

providing for a capability to make a determination of an intent, a focus and a mood of at least one of the one or more users based on at least a portion of the obtained multi-modal input data;

causing execution of one or more actions to occur in the environment based on at least one of the determined intent, the determined focus and the determined mood; and storing at least a portion of results associated with the intent, focus and mood determinations for possible use in a subsequent determination wherein the intent determination comprises resolving referential ambiguity associated with the one or more users and the one or more devices in the environment based on at least a portion of the received multi-modal data.

* * * * *

UNITED STATES PATENT AND TRADEMARK OFFICE
CERTIFICATE OF CORRECTION

PATENT NO. : 6,964,023 B2
DATED : November 8, 2005
INVENTOR(S) : S.H. Maes et al.

It is certified that error appears in the above-identified patent and that said Letters Patent is hereby corrected as shown below:

Column 27,
Lines 25-30, delete $$`` C'(\alpha) = \frac{1}{N}\sum_{n=1}^{N}\sum_{i} T_i(n) \frac{\exp^{\eta S_i^{qv}(n)}}{\sum_{j=1}^{P} \exp^{\eta S_i^{qv}(n)}}. \text{''}$$

and insert $$-- C'(\alpha) = \frac{1}{N}\sum_{n=1}^{N}\sum_{i} T_i(n) \frac{\exp^{\eta S_i^{qv}(n)}}{\sum_{j=1}^{P} \exp^{\eta S_j^{qv}(n)}}. --.$$

Column 46,
Line 31, delete "user and the one or more device" and insert -- users and the one or more devices --.

Column 47,
Line 33, delete "user and the one or more device" and insert -- users and the one or more devices --.

Signed and Sealed this

Seventh Day of February, 2006

JON W. DUDAS
*Director of the United States Patent and Trademark Office*